(12) United States Patent
Hiji et al.

(10) Patent No.: US 7,686,977 B2
(45) Date of Patent: Mar. 30, 2010

(54) LIQUID CRYSTAL-CONTAINING COMPOSITION, METHOD OF PRODUCING THE SAME AND LIQUID CRYSTAL DISPLAY DEVICE

(75) Inventors: Naoki Hiji, Kanagawa (JP); Chikara Manabe, Kanagawa (JP); Shigeru Yamamoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 274 days.

(21) Appl. No.: 11/797,066

(22) Filed: Apr. 30, 2007

(65) Prior Publication Data
US 2008/0067471 A1    Mar. 20, 2008

(30) Foreign Application Priority Data
Sep. 19, 2006    (JP) ............... 2006-252877

(51) Int. Cl.
*C09K 19/00*    (2006.01)
*C09K 19/52*    (2006.01)

(52) U.S. Cl. ............... 252/299.01; 430/20; 428/1.1

(58) Field of Classification Search ............... 430/20, 430/270.1; 252/299.01; 428/1.1
See application file for complete search history.

(56) References Cited

U.S. PATENT DOCUMENTS

2006/0239171 A1* 10/2006 Ooi et al. ............... 369/112.16

FOREIGN PATENT DOCUMENTS

| JP | A 5-80303 | 4/1993 |
|---|---|---|
| JP | A 6-51284 | 2/1994 |
| JP | A 7-98449 | 4/1995 |
| JP | A 8-320505 | 12/1996 |
| JP | A 11-249119 | 9/1999 |
| JP | A 2005-316243 | 11/2005 |

* cited by examiner

*Primary Examiner*—Geraldina Visconti
(74) *Attorney, Agent, or Firm*—Oliff & Berridge, PLC

(57) ABSTRACT

A liquid crystal-containing composition includes a cholesteric liquid crystal, a polymer, and concave and convex portions located at the interface between a region including the cholesteric liquid crystal and a region including the polymer.

12 Claims, 19 Drawing Sheets

AMOUNT OF PARTICLES TO BE ADDED (BASED ON THE LIQUID CRYSTAL)
DIAMETER OF PARTICLES

EXAMPLE A1

EXAMPLE A4

EXAMPLE A7

EXAMPLE A2

EXAMPLE A5

EXAMPLE A8

EXAMPLE A3

EXAMPLE A6

EXAMPLE A9

○: BRIGHT DISPLAY BEFORE TEST
□: BRIGHT DISPLAY AFTER TEST
△: DARK DISPLAY BEFORE TEST
◇: DARK DISPLAY AFTER TEST

COMPARATIVE EXAMPLE A1

Comparative Example A1

COMPARATIVE EXAMPLE B2

COMPARATIVE EXAMPLE B2

EXAMPLE B2

Example B2

EXAMPLE B3

Example B3

EXAMPLE B4

Example B4

COMPARATIVE EXAMPLE B1

Comparative Example B1

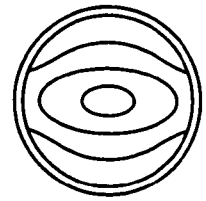
FIG.19A
BRIGHT DISPLAY
(PLANAR ORIENTATION)
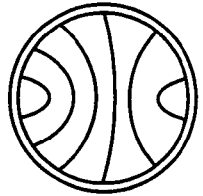
FIG.19D
DARK DISPLAY
(FOCAL CONIC
ORIENTATION)
JUST AFTER WRITING
HIGH-TEMPERATURE STORAGE →
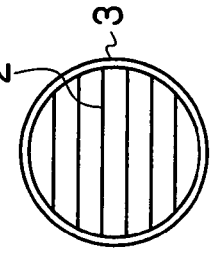
FIG.19B
FIG.19E
IN THE CASE OF
VERTICAL ORIENTATING
MICROCAPSULE
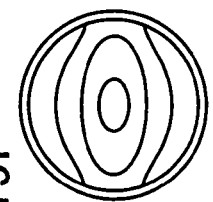
FIG.19C
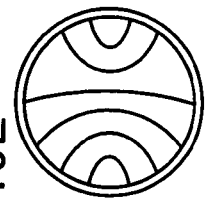
FIG.19F
IN THE CASE OF
PARALLEL ORIENTATING
MICROCAPSULE

LIQUID CRYSTAL-CONTAINING COMPOSITION, METHOD OF PRODUCING THE SAME AND LIQUID CRYSTAL DISPLAY DEVICE

CROSS-REFERENCE TO RELATED APPLICATION

This application claims priority under 35 USC 119 from Japanese patent Application No. 2006-252877.

BACKGROUND

1. Technical Field

The present invention relates to a liquid crystal-containing composition utilized for display devices, image/information recording devices, space light modulators and the like, to a method of producing a liquid crystal-containing composition and to a liquid crystal display device.

2. Related Art

Cholesteric liquid crystal display devices have characteristics such as memory-storing ability to keep displayed image without power supply, bright display due to elimination of use of polarizing plate and capability to provide a color display without using a color filter. Therefore, they have attracted attention in recent years (see, for example, Japanese Patent Application Laid-Open (JP-A) No. 05-080303).

In particular, the cholesteric liquid crystal includes helically aligned rod-like molecules and have the property of interferential reflection of the light having the equal wavelength to the helical pitch (also called selective reflection). Therefore, vivid color display can be attained without using a color filter by setting the helical pitch to a value corresponding to the wavelength of each of red, green and blue colors.

For example, a cholesteric liquid crystal sealed in a cell having a pair of substrates each having an electrode is known to take two orientation states: planar (P) orientation and focal conic (F) orientation. In the state of the P orientation, the helical axis is oriented in the direction almost perpendicular to the surface of the substrate, and selective reflection is observable. In the state of the F orientation, the helical axis is oriented in the direction almost parallel to the surface of the substrate, and this state permits transmission of light. The transition between these two orientation states can be achieved by applying voltage between the electrodes.

Therefore, when a photo-absorber in black or the like is arranged at the backside of the above cell, bright display in the selective reflection color can be achieved when the liquid crystal is in the P orientation state, and dark display in black, the color of the photo-absorber, can be achieved when the liquid crystal is in the F orientation state. The P orientation and F orientation among the above orientations can both be maintained stably without power source. Utilization of this nature makes it possible to realize a memory display that retains display without power source.

SUMMARY

According to an aspect of the present invention, a liquid crystal-containing composition includes a cholesteric liquid crystal, a polymer, and concave and convex portions located at the interface between a region including the cholesteric liquid crystal and a region including the polymer.

BRIEF DESCRIPTION OF THE DRAWINGS

Exemplary embodiments of the present invention will be described in detail based on the following figures, wherein:

FIGS. 19A to 19F are schematic diagrams for explaining the phenomenon in which conventional liquid crystal-containing compositions undergo deterioration in display quality when stored at high temperature.

In the above drawings, the symbols and the parts represented by these symbols are shown below.

DETAILED DESCRIPTION

Aspects of the present invention will be explained in detail.
The liquid crystal-containing composition according to an aspect of the present invention includes a cholesteric liquid crystal and a polymer. The liquid crystal-containing composition also has concave and convex portions located at the interface between a region including the cholesteric liquid crystal and a region including the polymer.

Figure 1:
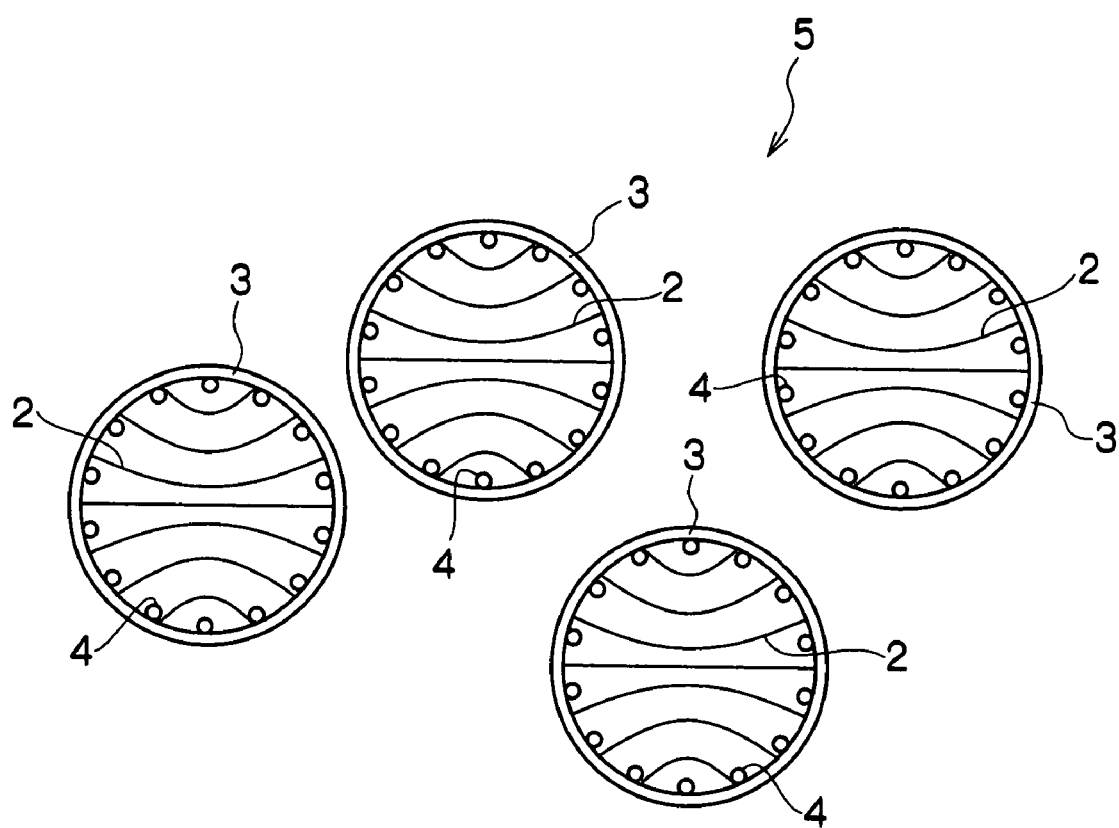
FIG. 1 is a schematic structural view showing an example of a liquid crystal-containing composition according to an aspect of the present invention.

Specifically, for example, a liquid crystal-containing composition 5, as shown in FIG. 1, contains a cholesteric liquid crystal 2 and microcapsules 3 containing the cholesteric liquid crystal 2 as the core material encapsulated in a polymer as the shell material. The liquid crystal-containing composition 5 includes a group of particles 4 disposed at the interface (interface at the side of the region including the cholesteric liquid crystal 2) between a region including the cholesteric liquid crystal 2 and the microcapsule 3, so that concave and convex portions are formed. In an exemplary embodiment, the microcapsules 3 are dispersed and held in a resin material as the polymer.

Figure 2:
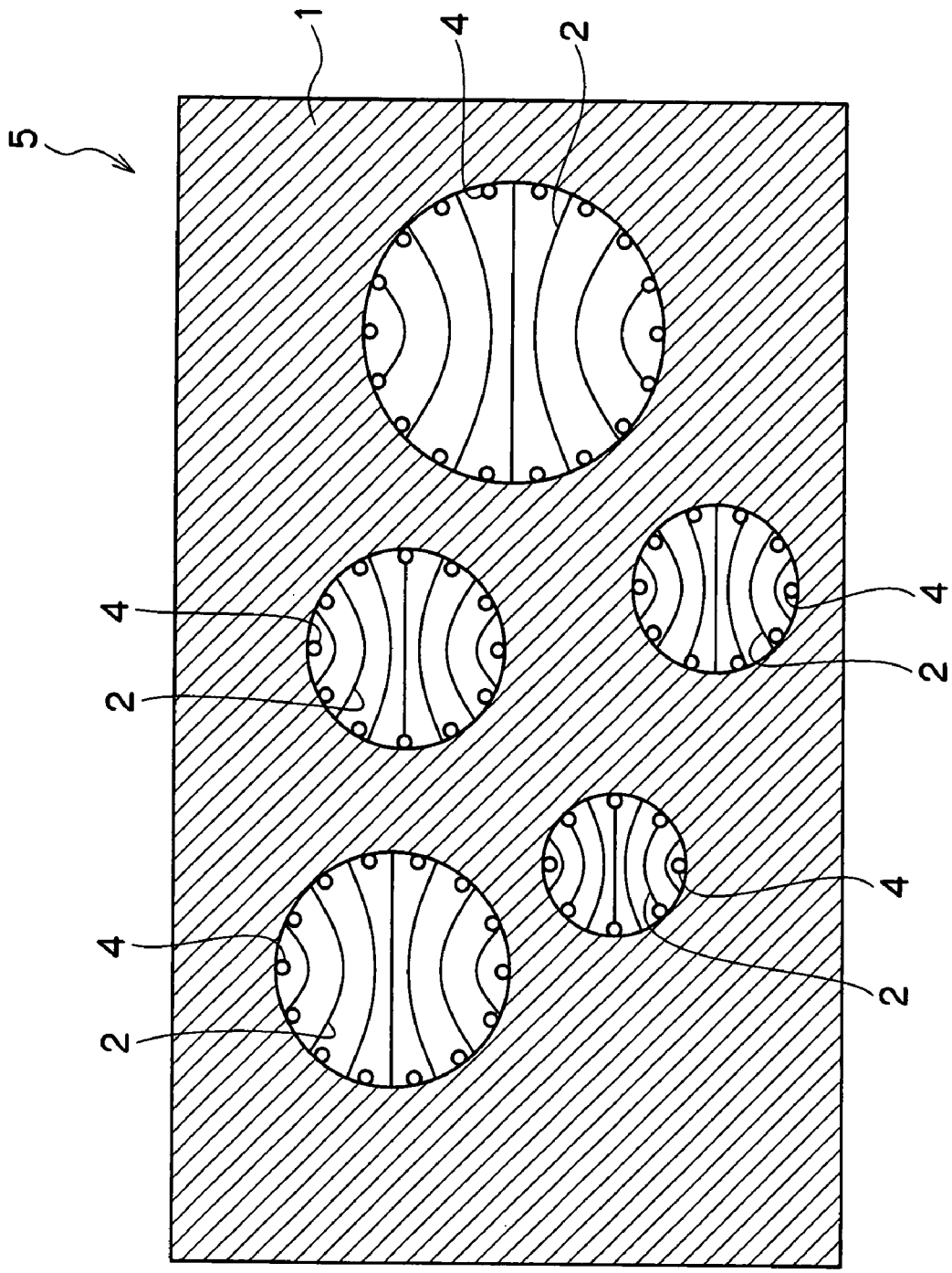
FIG. 2 is a schematic structural view showing another example of a liquid crystal-containing composition according to an aspect of the present invention.

In FIG. 2, the liquid crystal-containing composition 5 contains a cholesteric liquid crystal 2 and a resin material 1 (polymer) in which the cholesteric liquid crystal 2 is dispersed and held in a phase separation state. A group of particles 4 is disposed at the interface (interface on the side of the region including the cholesteric liquid crystal 2) between a region including the cholesteric liquid crystal 2 and the resin material 1, so that concave and convex portions are formed. Here, the "phase separation" refers to the state in which incompatible plural material systems exist as independent phases without intermingling with each other.

Here, FIG. 1 is a schematic structural view showing one example of a liquid crystal-containing composition according to an aspect of the present invention. FIG. 2 is a schematic structural view showing another example of a liquid crystal-containing composition according to an aspect of the present invention.

Even when, as in conventional techniques, the concave and convex portions are not formed, a liquid crystal molecules are forcedly oriented by voltage just after applying the certain period of voltage pulse, as shown in FIGS. 19A to 19F. Therefore, the helical layer of the cholesteric liquid crystal 2 is oriented in a direction substantially horizontal to the surface of a substrate (not shown) as shown in (a) at bright display time, and is oriented in a direction substantially perpendicular to the surface of the substrate as shown in (b) at dark display time. However, when the liquid crystal is stored at high temperature, the molecular motion of the liquid crystal is activated, so that the orientation thereof starts to transit to a more stable orientation. For example, when the microcapsule 3 (shell) has vertical orientating property, which orients liquid crystal molecules in a vertical direction to its interface, the orientation of the liquid crystal molecules is distorted as shown in (b) or (e) since the helical layer of the cholesteric liquid crystal 2 tends to orient in a vertical direction to the interface. Alternatively, when the microcapsule 3 (shell) has the parallel orientating property, which orients liquid crystal molecules in a parallel direction to its interface, the orientation of the liquid crystal molecules is distorted as shown in (c) or (d) since the helical layer of the cholesteric liquid crystal 2 tends to orient in a parallel direction to the interface. The orientation distortion changes the reflection spectrum, so that the display quality is deteriorated.

In contrast, in the liquid crystal-containing composition according to an aspect of the present invention having a structure as described above, the movement of the cholesteric liquid crystal is inhibited since the helical layer of the cholesteric liquid crystal is caught on the concave and convex portions located at the interface. In other words, it is considered that an "orientation pinning effect" is produced.

The liquid crystal-containing composition according to an aspect of the present invention will be explained in detail. In the following explanations, reference characters are omitted.

First, the cholesteric liquid crystal is described. The cholesteric liquid crystal is a liquid crystal material containing an optically active compound and may be obtained by 1) a method of adding, for example, an optically active compound called a chiral agent to a nematic liquid crystal or 2) a method of using a liquid crystal material that is itself optically active such as cholesterol derivatives. In the former method, known nematic liquid crystal-containing compositions such as a cyanobiphenyl liquid crystal, phenylcyclohexane liquid crystal, phenyl benzoate liquid crystal, cyclohexyl benzoate liquid crystal, azomethine liquid crystal, azobenzene liquid crystal, pyrimidine liquid crystal, dioxane liquid crystal, cyclohexylcyclohexane liquid crystal, stilbene liquid crystal and tolan liquid crystal may be utilized as the nematic liquid crystal material. As the chiral agent, for example, cholesterol derivatives and compounds having an optically active group such as a 2-methylbutyl group may be utilized.

Additives such as dyes and particles may be added to the cholesteric liquid crystal. The cholesteric liquid crystal may be gelled with a crosslinking polymer, a hydrogen bonding gelling agent or the like, and may be any of a high-molecular liquid crystal, a middle-molecular liquid crystal or a low-molecular liquid crystal or a mixture thereof. The helical pitch of the cholesteric liquid crystal may be varied by the type and the amount of the chiral agent and by the type of liquid crystal material. The wavelength of the selective reflection may be in the visible wavelength region, ultraviolet wavelength region or infrared wavelength region. The average particle diameter of the cholesteric liquid crystal droplets (including microcapsules) dispersed in the after-mentioned polymer may be at least three times the helical pitch of the cholesteric liquid crystal from the viewpoint of obtaining memory characteristics.

A vertically orientating component such as an alkyl group may be introduced as an orientating agent into the interface between the cholestric liquid crystal and the polymer or into the inside of the polymer. The horizontally orientating property that the polymer intrinsically has may be canceled by the vertical orientating property given by the introduction of the vertically orientating component, whereby the orientation defining force may be weakened. As a result, a flat cholesteric liquid crystal layer without distortion may be obtained, so that color purity and display contrast may be improved. Further, since the orientation defining force is weak, difference in energy between orientation states of the liquid crystal molecules in contact with the polymer is small, the P orientation and the F orientation are both stable over time. The details of such a vertically orientating component may be found in JP-A No. 2005-316243.

Next, the particles forming the concave and convex portions disposed at the interface between a region including the cholesteric liquid crystal and a region including the polymer will be described. Examples of the particles include organic particles and inorganic particles.

Examples of the organic particles include polyurethane resin particles, acryl resin particles, methacryl resin particles, epoxy resin particles, polystyrene resin particles, synthetic rubber particles and melamine particles. These materials may be crosslinked so as not to be dissolved in the liquid crystal.

Examples of the inorganic particles include metal oxide particles such as silica particles, alumina particles, titanium oxide particles and zinc oxide particles, metal colloids such as gold colloid and silver colloid and semiconductor particles such as zinc sulfide particles and selenium sulfide particles.

As to the size of the particles, the average particle diameter of the particles is preferably in the range from 1/10 to 5 times the helical pitch of the cholesteric liquid crystal, and more preferably from 1/5 to 2 times the helical pitch of the cholesteric liquid crystal. For example, in the case of a cholesteric liquid crystal which has a helical pitch of 400 nm and reflects a red color, the average particle diameter is preferably in the range from 40 nm to 2 µm and more preferably from 80 to 800 nm. Stabilization of the orientation may not be achieved above or below this range.

The particles are preferably added such that the density of the particles located at the interface is from 0.3 to 20 particles/µm$^2$ (more preferably from 0.5 to 5 particles/µm$^2$). When the particle density is too large, there may be a case where the orientation is significantly disturbed and thus the display contrast is reduced. When the particle density is too small on the other hand, there may be a case where stabilization of the orientation of the cholesteric liquid crystal may not be obtained.

Here, the average particle diameter and the particle density are measured in the following methods. A coating film made from the liquid crystal-containing composition is cut by a sharp cutter and the section of the coating film is washed with alcohol and dried. Then, gold is deposited on the section. Then, the section is observed under a scanning electron microscope (trade name: S-4500 MODEL, manufactured by Hitachi, Ltd.) to measure the diameter of particles located at the interface between a region including the cholesteric liquid crystal and a region including the polymer, thereby counting the surface density.

Examples of the method of producing the liquid crystal-containing composition according to an aspect of the present invention include (1) a microcapsule method in which the cholesteric liquid crystal is used as the core material and the polymer is used as the shell material, (2) a dispersion drying method in which the cholesteric liquid crystal is dispersed in a solution of the polymer (resin material), such as an aqueous polyvinyl alcohol solution, that is incompatible with the cholesteric liquid crystal, and then the solvent is removed by drying, (3) a phase separation method in which the cholesteric liquid crystal and the polymer or a precursor of the polymer are intermixed once by using heat or a solvent, and then external stimulus such as heat or light is added to the mixture to separate the cholesteric liquid crystal phase from the polymer phase (resin material) and (4) an impregnation method in which a network polymer structure is manufactured in advance and then is impregnated with the cholesteric liquid crystal.

Examples of the phase separation method (3) include 1) a solvent phase separation method in which the cholesteric liquid crystal and the polymer are intermixed by using a co-solvent and then the solvent is evaporated under reduced pressure or heat to cause phase separation, 2) a polymerization phase separation method in which a monomer or an oligomer and the cholesteric liquid crystal are intermixed and a crosslinking reaction is conducted by application of heat, light or electron beams to reduce compatibility, thereby causing phase separation and (3) a thermal phase separation method in which the cholesteric liquid crystal and the polymer are heated so that they are intermixed, and then the mixture is cooled to accomplish phase separation.

Each production method will be explained in detail.
(1) Microcapsule Method
Examples of the method of producing a microcapsule include 1) a phase separation method of causing phase separation of an aqueous polymer solution in which the liquid crystal is dispersed, so as to form a film on the surface of liquid crystal droplets, 2) an in-liquid drying method of dissolving the polymer and the liquid crystal in a co-solvent, dispersing the solution in a water phase and evaporating the solvent, 3) an interfacial polymerization method of dispersing a mixed solution (oil phase solution) of the liquid crystal and an oil-soluble monomer A in a water phase and adding an aqueous monomer B thereto so as to cause interfacial polymerization reaction of the monomer A and the monomer B and so as to form a film and 4) an in situ polymerization method of dissolving a monomer in the liquid crystal or in an aqueous phase and causing polymerization by heat or the like whereby the precipitated polymer forms a film.

—Phase Separation Method—

The phase separation method may be a complex coacervation method in which an aqueous solution containing two water-soluble polymers is phase-separated into a concentrated phase and a dilute phase by controlling pH and temperature. The two water-soluble polymers may be a combination of gelatin and gum arabic, a combination of a protein and a polysaccharide, a combination of a protein and another protein, a combination of a protein and a nucleic acid or a combination of a polysaccharide and nucleic acid. The phase separation method may also be a simple coacervation method of adding an organic solvent compatible with water (e.g., alcohol or acetone) is to a water-soluble polymer solution of polyvinyl alcohol, gelatin, alkyl cellulose or the like so as to cause phase separation.

—In-Liquid Drying Method—

In the in-liquid drying method, an example of usable methods include dissolving the polymer and the liquid crystal in a low-boiling point solvent, dispersing the obtained solution in a water phase and evaporating the solvent under reduced pressure or heat. The combination of the polymer and the solvent may be, for example, a combination of a fluororesin and a fluorine-containing solvent such as chlorofluorocarbon, or a combination of methylene chloride and any of an acryl, urethane or polyester resin having an alkyl or alkyl halide group introduced therein.

—Interfacial Polymerization Method—

In the interfacial polymerization method, the oil-soluble monomer A may be a polyvalent compound having plural functional groups which may be selected from basic acid halide, haloformate, isocyanate, isothiocyanate, ketene, carbodiimide, epoxy, glycidyl ether, oxazoline, ethyleneimine or lactone groups. The water-soluble monomer B may be a polyvalent compound having plural functional groups which may be selected from amine, alcohol, carboxylic acid, mercaptan and phenol groups.

—in situ Polymerization Method—

The in situ polymerization method may be 1) a method of polymerizing the oil-soluble monomer A with a monomer C, or 2) a method of using a monomer D, such as a radically polymerizable monomer, that can polymerize by itself. In the case of 1), as the monomer A, the monomer A described in the paragraph on the interfacial polymerization method may be used similarly. Examples thereof include polyvalent compounds having, in one molecule, plural functional groups that may be selected from basic acid halide, haloformate, isocyanate, isothiocyanate, ketene, carbodiimide, epoxy, glycidyl ether, oxazoline, ethyleneimine and lactone groups. As the monomer C, polyvalent compounds having, in one molecule, plural functional groups that may be selected from amine, alcohol, carboxylic acid, mercaptan and phenol groups may be used. In the case of 2), as the monomer D, polyvalent epoxy compounds, polyvalent isocyanate compounds, unsaturated hydrocarbon compounds, and the like may be used. Examples thereof include styrene, isoprene, butadiene, vinyl chloride, vinylidene chloride, acrylonitrile, acrylic acid derivatives and methacrylic acid derivatives. The wall material may be formed from a water phase. In this case, water-soluble monomers such as melamine/formaldehyde may be used.

(2) Dispersion Drying Method

In the dispersion drying method, the polymer to be used may be a water-soluble polymer that has low compatibility with the cholesteric liquid crystal and low swelling characteristics in the cholesteric liquid crystal. Examples thereof include polyvinyl alcohol, alkyl cellulose and gelatin. The liquid crystal-containing composition is obtained by dispersing the cholesteric liquid crystal in an aqueous solution of the water-soluble polymer, applying the dispersion onto a substrate and drying the coating layer to remove water.

(3) Phase Separation Method

—Solvent Phase Separation Method—

The solvent phase separation method may be a method of preparing a solution in which the polymer and the liquid crystal are dissolved in a co-solvent, applying the solution onto a substrate, and then evaporating the solvent to obtain a liquid crystal-containing composition. The polymer and the solvent may be selected from similar materials to those usable in the above-mentioned in-liquid drying method for microcapsules. However, in this method, since drying is carried out in a vapor phase, the evaporation rate of the solvent is high, so that the particle diameter is excessively small in some cases. Therefore, a solvent having a higher boiling point and lower vapor pressure may be utilized.

—Polymerization Phase Separation Method—

In the polymerization phase separation method, the above-mentioned monomers that are usable in the in situ polymerization method for microcapsules may be used. Specifically, in this method, a solution in which the monomer and the liquid crystal are dissolved is applied onto a substrate or injected into a cell, and a polymerization reaction is allowed to proceed to cause phase separation.

—Thermal Phase Separation Method—

In the thermal phase separation method, a method of melting the polymer and the liquid crystal and mixing them may be used. In the case of 1), the polymer to be used may be a thermoplastic resin such as a polyvinylbutyral, ethylene-vinyl acetate copolymer, ethylene-vinyl chloride copolymer, vinyl chloride-vinyl acetate copolymer or polyester, or modified products thereof. In the case of 2), the polymer to be used may be selected from the polymers described for the case of 1).

(4) Impregnation Method

In the impregnation method, for example, a method of fusing particles of a fluororesin or silicon resin so as to form a porous material may be used.

In each of the above methods, it is preferable to use, as the polymer, a polymer having low solubility in the liquid crystal such as water-soluble resins, fluororesins and silicon resins, or to crosslink the polymer in order to prevent swelling and dissolution caused by the liquid crystal.

As mentioned above, the liquid crystal-containing composition according to an aspect of the present invention may be manufactured by various methods. In particular, encapsulated liquid crystal compositions have a wide range of utilization because of the characteristics such as i) they can be dispersed in a binder material and applied onto various surfaces, ii) one or more other functional layers can be formed thereon because the liquid crystal is protected by a wall material, and iii) they are excellent in mechanical strength such as resistance to pressure and bending.

In each of the above methods, the formation of the aforementioned concave and convex portions with particles may be achieved by allowing the particles to adhere to the interface between the liquid crystal and the polymer through a method of adding the particles into a mixture of the polymer or a precursor (monomer) thereof and the cholesteric liquid crystal. The particles may be added to the polymer or the precursor (monomer) thereof in advance, and/or may be added to the cholesteric liquid crystal in advance.

When the particles are organic particles, one or more monomer components that can form the organic particles when polymerized (one or more monomers as the raw material of the particles) may be added together with other components, and may be polymerized during the production of the liquid crystal-containing composition so as to precipitate the particles that are located at the interface described above. The particles may be formed by precipitation of homopolymer particles that are formed by thermal polymerization or photopolymerization of an unsaturated compound such as an epoxy compound, acryl compound, methacryl compound or vinyl compound. As an alternative, the particles may be formed from two monomers through precipitation caused by an in situ polymerization method. For example, epoxy resin particles may be formed from an epoxy compound and an amine compound and precipitated, or urethane resin particles may be formed from an isocyanate compound and a polyol compound and precipitated.

In a specific example of the microcapsule method as the production method, the cholesteric liquid crystal, a monomer for microcapsules, a monomer for particles and optionally an orientating agent are dispersed/emulsified in a water phase. Then, the mixture is heated, so that particles are formed from the monomer for particles and microcapsules (shells) are produced from the monomer for microcapsules. The produced particles adhere to the inside wall of the microcapsules (shells) to provide desired concave and convex portions. The particles are thus polymerized and precipitated. The particle diameter and the particle density may be controlled by utilizing the difference between the reaction rates of the monomer components and the difference between the amounts of the monomer components to be added.

The liquid crystal-containing composition according to an aspect of the present invention may be applied onto a substrate using a printing method such as screen printing, relief-printing, intaglio printing, planographic printing or flexo printing or a coating method such as a spin coating method, bar coating method, dip coating method, roll coating method, knife coating method or die coating method.

The liquid crystal-containing composition according to an aspect of the present invention may be utilized for, for example, display devices, image/information recording devices and space light modulator. In particular, the liquid crystal-containing composition may be utilized in display devices such as liquid crystal display devices. The liquid crystal display device according to an aspect of the present invention is described below.

Figure 3:
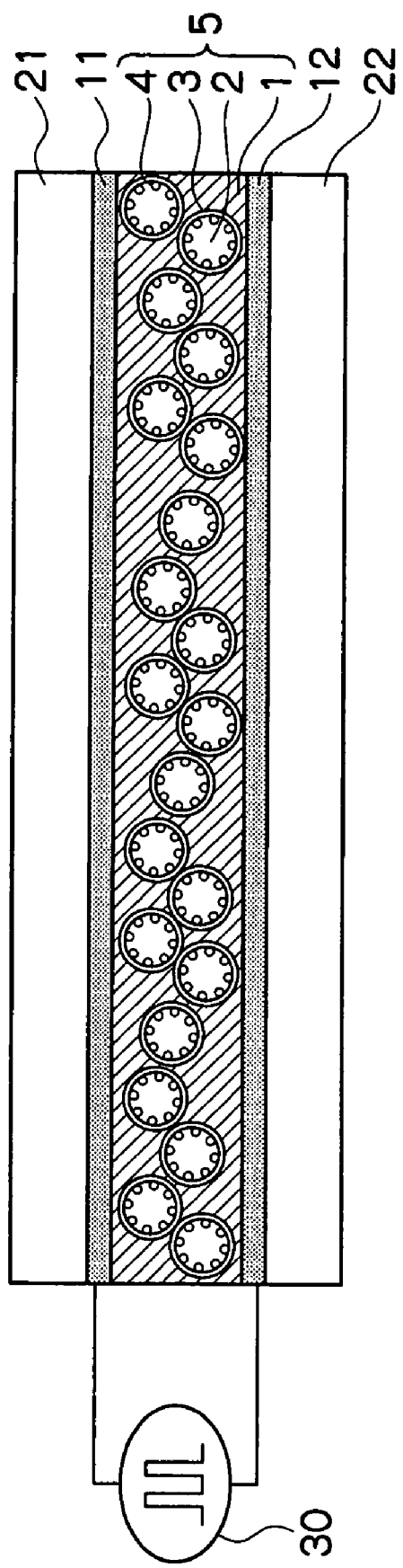
FIG. 3 is a schematic structural view showing an example of a liquid crystal display device according to an aspect of the present invention.

The liquid crystal device according to an aspect of the present invention has a structure in which the above liquid crystal-containing composition according to an aspect of the present invention is sandwiched between a pair of electrodes. Specifically, for example, a structure as shown in FIG. 3 may be adopted, in which a liquid crystal-containing composition 5 is sandwiched between substrates 21 and 22 provided with electrodes 11 and 12 respectively, and a voltage pulse is applied by a drive circuit 30 to perform display. As the display background, a light-absorbing member may be disposed between the liquid crystal-containing composition 5 and the electrode 12 or on the backside of the substrate 22. As the substrates 21 and 22, for example, glass and a resin (transparent dielectric body such as polyethylene terephthalate, polyether sulfone, polycarbonate and polyolefin) may be used. As the electrodes 11 and 12, for example, a transparent conductive film made of an indium tin oxide alloy or zinc oxide may be used.

Figure 4:
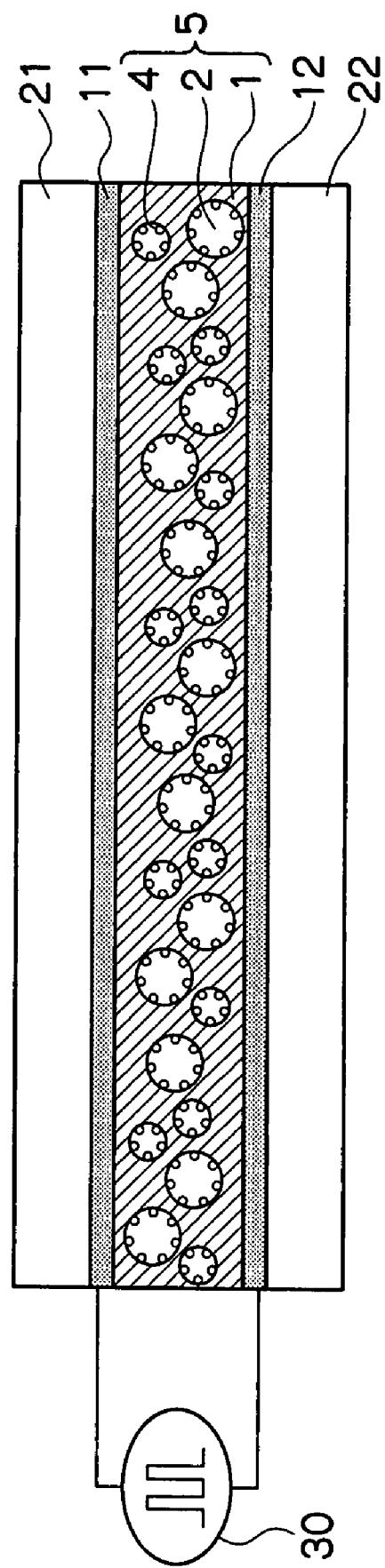
FIG. 4 is a schematic structural view showing another example of a liquid crystal display device according to an aspect of the present invention.

Here, the liquid crystal display device shown in FIG. 3 corresponds to an exemplary embodiment of the liquid crystal-containing composition 5, wherein microcapsules 3 containing a cholesteric liquid crystal 2 is dispersed and retained in a resin material 1 and particles 4 are exists at the interface between the cholesteric liquid crystal 2 and the microcapsule 3 to provide concave and convex portions. Of course, the liquid crystal display device is not limited to the above structure. For example, as shown in FIG. 4, the liquid crystal-containing composition 5 may have a structure in which the cholesteric liquid crystal 2 is dispersed and retained in a phase-separated state in the resin material 1 and also, the particles 4 exist at the interface between the cholesteric liquid crystal 2 and the resin material 1 to provide concave and convex portions. The meaning of the other reference characters in FIG. 4 is the same as in FIG. 3.

The liquid crystal-containing composition according to an aspect of the present invention increases the optical difference between P orientation and F orientation among the memory state of the cholesteric liquid crystal. Therefore, in the liquid crystal display device according to an aspect of the present invention, the display mode may be other than the selective reflection mode described above; for example, the display mode may be scattering-transmission mode utilizing a difference in light scattering intensity between P orientation and F orientation, an optical rotation mode utilizing a difference in the angle of rotation between P orientation and F orientation or a birefringence mode utilizing a difference in birefringence between P orientation and F orientation. In such cases, a polarizing plate and/or a retardation plate may be used additionally as auxiliary members. Also, a dichromatic dye may be added to the liquid crystal so as to enable display in a guest-host mode.

The method for driving the liquid crystal display device according to an aspect of the present invention may be a known driving method. Examples thereof include 1) a segment driving method in which the liquid crystal-containing composition is sandwiched between electrodes that are patterned in a display form and drive the device, 2) a simple matrix driving method in which the liquid crystal-containing composition is sandwiched between a pair of stripe electrode substrates that are at right angles to each other and an image is written by line-sequential scanning, 3) an active matrix driving method in which each pixel is provided with active devices such as a thin film transistor, a thin film diode and a MIM (metal-insulator-metal) device to drive the liquid crystal display device through these active devices, 4) an optical driving method in which the liquid crystal-containing composition is laminated with a photoconductive material, the obtained laminate is sandwiched between a pair of electrodes, and voltage is applied while projecting a light image to write an image, 5) a thermal driving method in which the liquid crystal-containing composition sandwiched between a pair of electrodes is made to transit to P orientation by adding voltage and then is heated to a temperature that is no lower than the phase transition temperature by a laser or thermal head to write an image and 6) an electrostatic driving method in which the liquid crystal-containing composition is applied to an electrode substrate to write an image with a stylus head or ion head.

EXAMPLES

Aspects of the present invention will be explained in more detail by way of examples. However, these examples should not be construed as limiting the invention. In the examples, "parts" means "parts by weight", unless otherwise noted.

Example A

Particle Addition Type

Example A1

84 parts of a nematic liquid crystal E7 (manufactured by Merck Co., Ltd.), 10.8 parts of a chiral agent R811 (manufactured by Merck Co., Ltd.) and 2.7 parts of a chiral agent R1011 (manufactured by Merck Co., Ltd.) are mixed to obtain 100 parts of a cholesteric liquid crystal that selectively reflects light having a wavelength of 650 nm. This cholesteric liquid crystal, 10 parts of a polyvalent isocyanate (trade name: TAKENATE D-110N, manufactured by Takeda Pharmaceutical Company Limited.), 3 parts of octadecanol (manufactured by Aldrich Corporation) as a precursor of a vertical orientating component and 0.6 parts of particle seeds (colloidal silica particles: average particle diameter: 70 nm, manufactured by FUSO CHEMICAL CO., LTD) are dissolved in 1000 parts of ethyl acetate to prepare an oil phase composition. The composition is poured into 10,000 parts of an aqueous 1% polyvinyl alcohol solution and the resultant mixture is stirred and dispersed with a mixer to produce an o/w emulsion having a diameter of about 7 µm.

100 parts of an aqueous 10% polyallylamine (manufactured by Nitto Boseki Co., Ltd.) solution is added to the obtained mixture, which is then heated at 70° C. for 2 hours to produce microcapsules having a polyurea wall. After the microcapsules are collected by centrifugation, an aqueous polyvinyl alcohol solution is added to the microcapsules to prepare a microcapsule liquid crystal coating material.

Next, the above microcapsule liquid crystal coating material is applied to a commercially available ITO deposited PET resin film by an applicator in a dry thickness of 30 µm. An aqueous polyvinyl alcohol solution in which carbon black is dispersed is applied thereon in a dry thickness of 3 µm to form a light absorbing layer. Separately, a separate ITO deposited PET resin film is prepared and a two-liquid urethane type adhesive is applied thereon in a dry thickness of 3 µm. Then, this film is adhered to the above substrate that is coated with the microcapsule liquid crystal coating material, to produce a liquid crystal display device.

Figure 5:
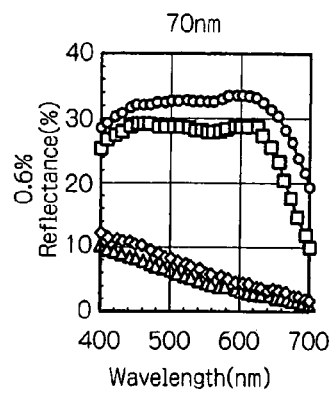
FIG. 5 is a view showing the reflection spectra of the liquid crystal display devices obtained in Examples A1 to A9 at bright display time and dark display time.
Figure 5:
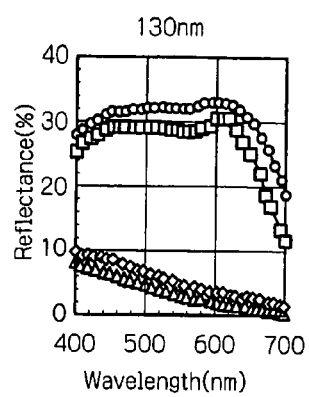
Figure 5:
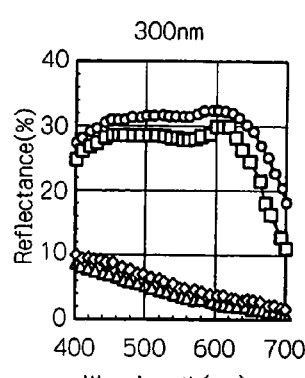
Figure 5:
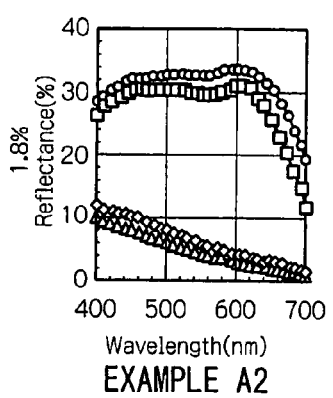
Figure 5:
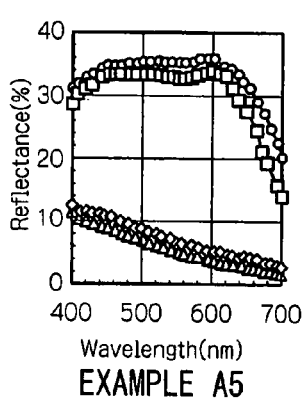
Figure 5:
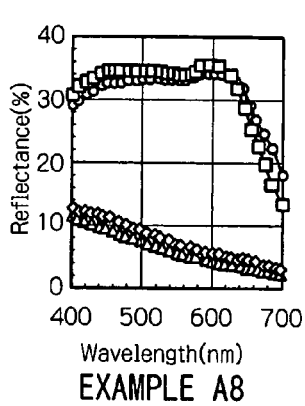
Figure 5:
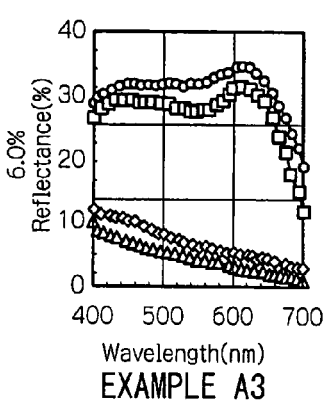
Figure 5:
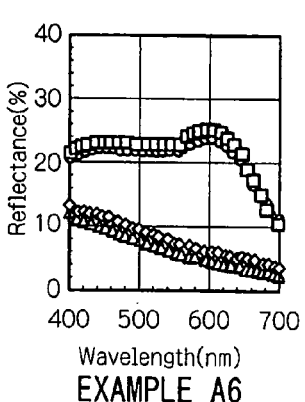
Figure 5:
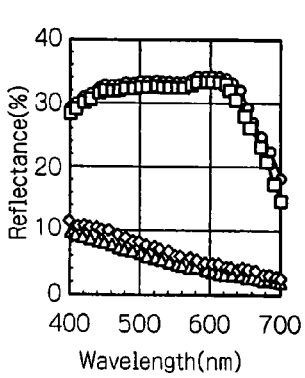
Figure 6:
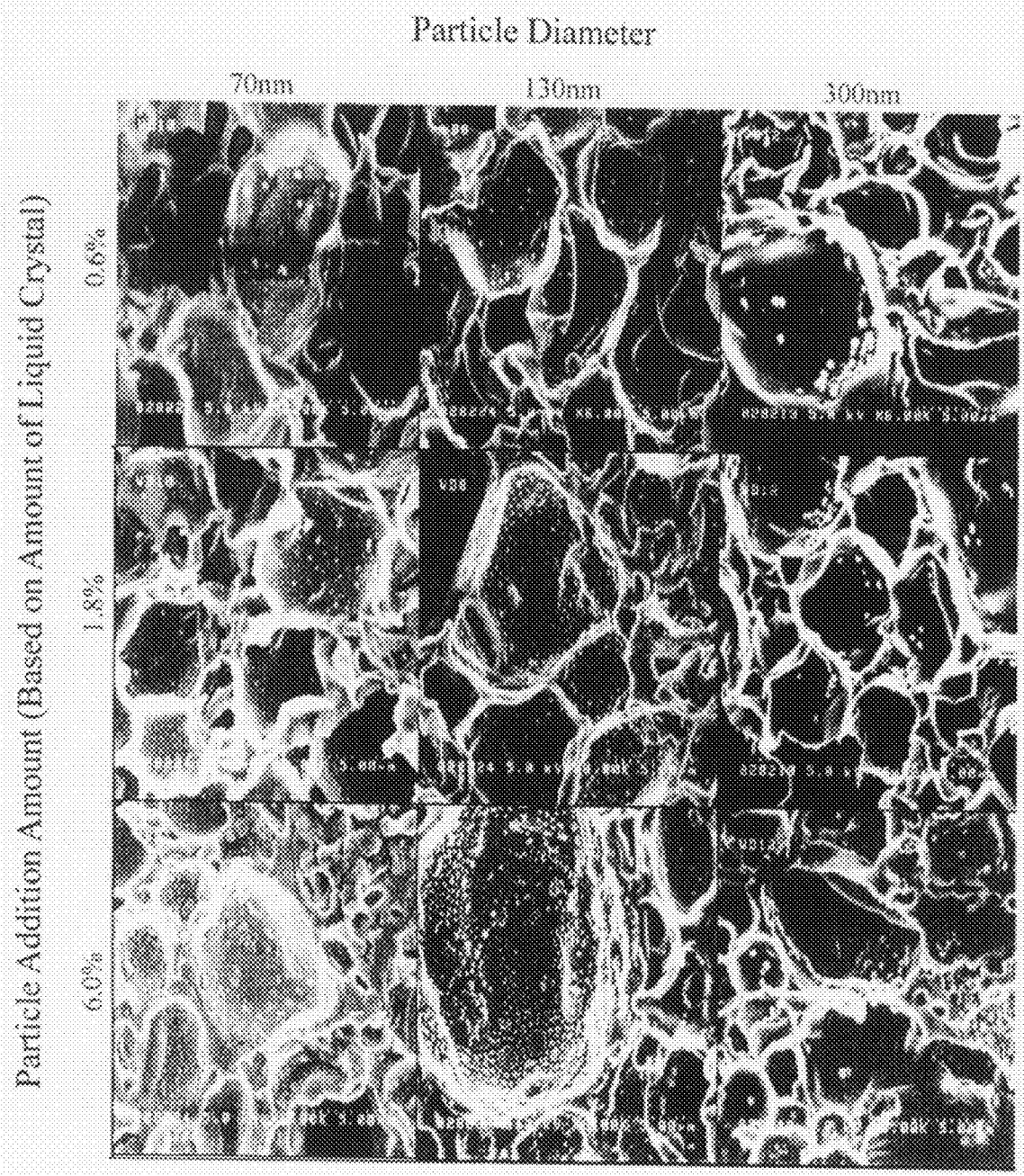
FIG. 6 is a view showing SEM photographs of the liquid crystal-containing compositions of the liquid crystal display devices obtained in Examples A1 to A9.

With respect to the obtained liquid crystal display device, the reflection spectra at bright display time and dark display time just after the production of the device, and the reflection spectra at bright display time and dark display time after the device is stored at 55° C. for one hour are measured. The results are shown in FIG. 5. A SEM photograph of the liquid crystal-containing composition of the liquid crystal display device is shown in FIG. 6. The particle density of the particles present at the interface between the cholesteric liquid crystal and the microcapsule is measured, and is found to be 7.8 particles/µm$^2$.

Example A2

A liquid crystal display device is produced in the same manner as in Example A1 except that the amount of the particles to be added is altered to 1.8 parts.

With respect to the obtained liquid crystal display device, the reflection spectra at bright display time and dark display time just after the production of the device, and the reflection spectra at bright display time and dark display time after the device is stored at 55° C. for one hour are measured. The results are shown in FIG. 5. A SEM photograph of the liquid crystal-containing composition of the liquid crystal display device is shown in FIG. 6. The particle density of particles present at the interface between the cholesteric liquid crystal and the microcapsule is measured, and is found to be 15.0 particles/$\mu m^2$.

Example A3

A liquid crystal display device is produced in the same manner as in Example A1 except that the amount of the particles to be added is altered to 6 parts.

With respect to the obtained liquid crystal display device, the reflection spectra at bright display time and dark display time just after the production of the device, and the reflection spectra at bright display time and dark display time after the device is stored at 55° C. for one hour are measured. The results are shown in FIG. 5. A SEM photograph of the liquid crystal-containing composition of the liquid crystal display device is shown in FIG. 6. The particle density of the particles present at the interface between the cholesteric liquid crystal and the microcapsule is measured, and is found to be 23 particles/$\mu m^2$.

Example A4

A liquid crystal display device is produced in the same manner as in Example A1 except that the added particles are changed to 0.6 parts of particles having an average particle diameter of 130 nm.

With respect to the obtained liquid crystal display device, the reflection spectra at bright display time and dark display time just after the production of the device, and the reflection spectra at bright display time and dark display time after the device is stored at 55° C. for one hour are measured. The results are shown in FIG. 5. A SEM photograph of the liquid crystal-containing composition of the liquid crystal display device is shown in FIG. 6. Also, the particle density of the particles present at the interface between the cholesteric liquid crystal and the microcapsule is measured, and is found to be 3.2 particles/$\mu m^2$.

Example A5

A liquid crystal display device is produced in the same manner as in Example A1 except that the added particles are changed to 1.8 parts of particles having an average particle diameter of 130 nm.

With respect to the obtained liquid crystal display device, the reflection spectra at bright display time and dark display time just after the production of the device, and the reflection spectra at bright display time and dark display time after the device is stored at 55° C. for one hour are measured. The results are shown in FIG. 5. A SEM photograph of the liquid crystal-containing composition of the liquid crystal display device is shown in FIG. 6. Also, the particle density of the particles present at the interface between the cholesteric liquid crystal and the microcapsule is measured, and is found to be 6.0 particles/$\mu m^2$.

Example A6

A liquid crystal display device is produced in the same manner as in Example A1 except that the added particles are changed to 6.0 parts of particles having an average particle diameter of 130 nm.

With respect to the obtained liquid crystal display device, the reflection spectra at bright display time and dark display time just after the production of the device, and the reflection spectra at bright display time and dark display time after the device is stored at 55° C. for one hour are measured. The results are shown in FIG. 5. A SEM photograph of the liquid crystal-containing composition of the liquid crystal display device is shown in FIG. 6. Also, the particle density of the particles present at the interface between the cholesteric liquid crystal and the microcapsule is measured, and is found to be 16.0 particles/$\mu m^2$.

Example A7

A liquid crystal display device is produced in the same manner as in Example A1 except that the added particles are changed to 0.6 parts of particles having an average particle diameter of 300 nm.

With respect to the obtained liquid crystal display device, the reflection spectra at bright display time and dark display time just after the production of the device, and the reflection spectra at bright display time and dark display time after the device is stored at 55° C. for one hour are measured. The results are shown in FIG. 5. A SEM photograph of the liquid crystal-containing composition of the liquid crystal display device is shown in FIG. 6. Also, the particle density of the particles present at the interface between the cholesteric liquid crystal and the microcapsule is measured, and is found to be 1.2 particles/$\mu m^2$.

Example A8

A liquid crystal display device is produced in the same manner as in Example A1 except that the added particles are changed to 1.8 parts of particles having an average particle diameter of 300 nm.

With respect to the obtained liquid crystal display device, the reflection spectra at bright display time and dark display time just after the production of the device, and the reflection spectra at bright display time and dark display time after the device is stored at 55° C. for one hour are measured. The results are shown in FIG. 5. A SEM photograph of the liquid crystal-containing composition of the liquid crystal display device is shown in FIG. 6. Also, the particle density of the particles present at the interface between the cholesteric liquid crystal and the microcapsule is measured, and is found to be 1.7 particles/$\mu m^2$.

Example A9

A liquid crystal display device is produced in the same manner as in Example A1 except that the added particles are changed to 6.0 parts of particles having an average particle diameter of 300 nm.

With respect to the obtained liquid crystal display device, the reflection spectra at bright display time and dark display time just after the production of the device, and the reflection spectra at bright display time and dark display time after the device is stored at 55° C. for one hour are measured. The results are shown in FIG. 5. A SEM photograph of the liquid crystal-containing composition of the liquid crystal display device is shown in FIG. 6. Also, the particle density of the particles present at the interface between the cholesteric liquid crystal and the microcapsule is measured, and is found to be 2.0 particles/$\mu m^2$.

Comparative Example A1

A liquid crystal display device is produced in the same manner as in Example A1 except that the particles are not added when the oil phase composition is prepared.

Figure 7:
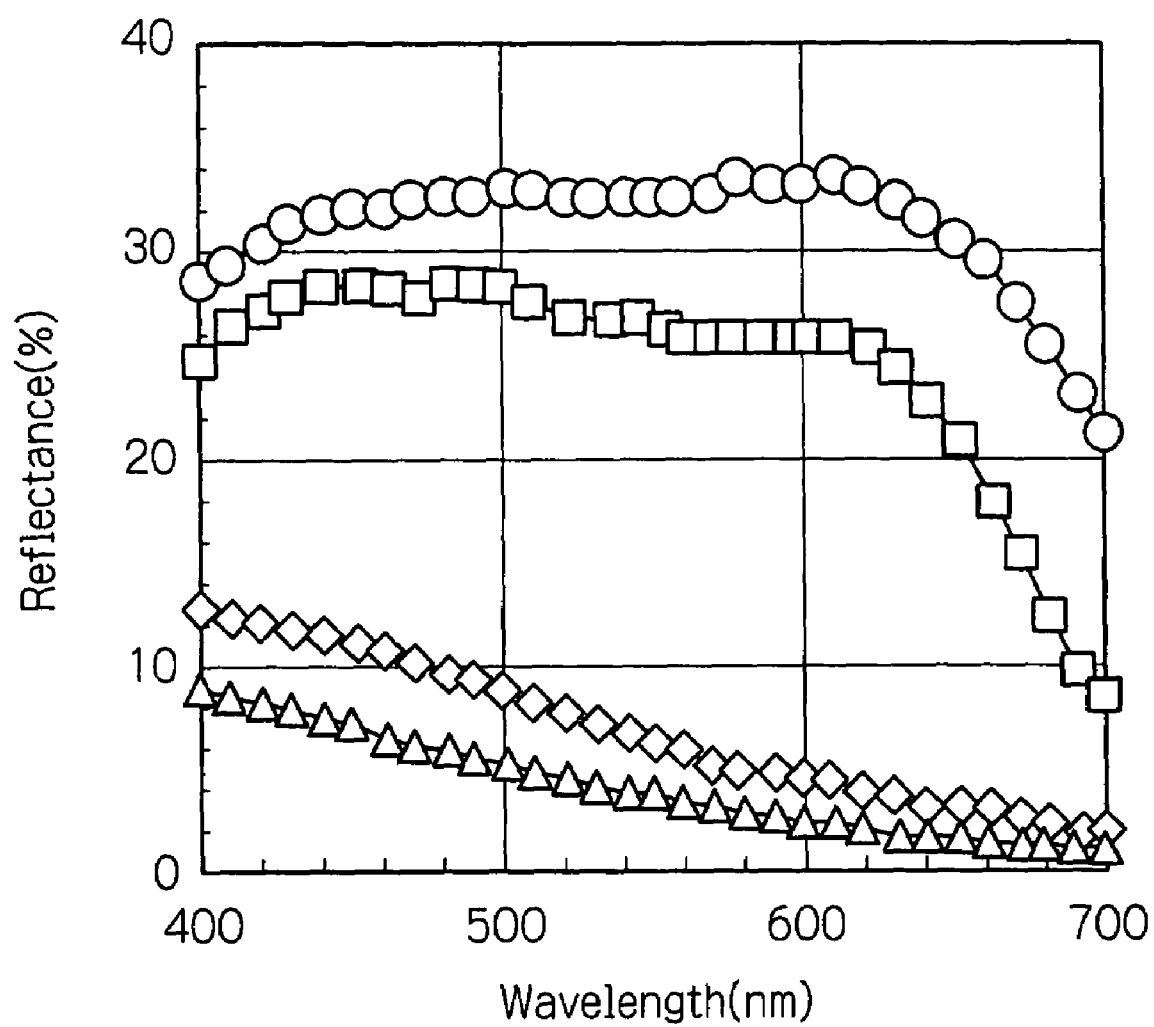
FIG. 7 is a view showing the reflection spectrum of the liquid crystal display device obtained in Comparative Examples A1 at bright display time and dark display time.
Figure 8:
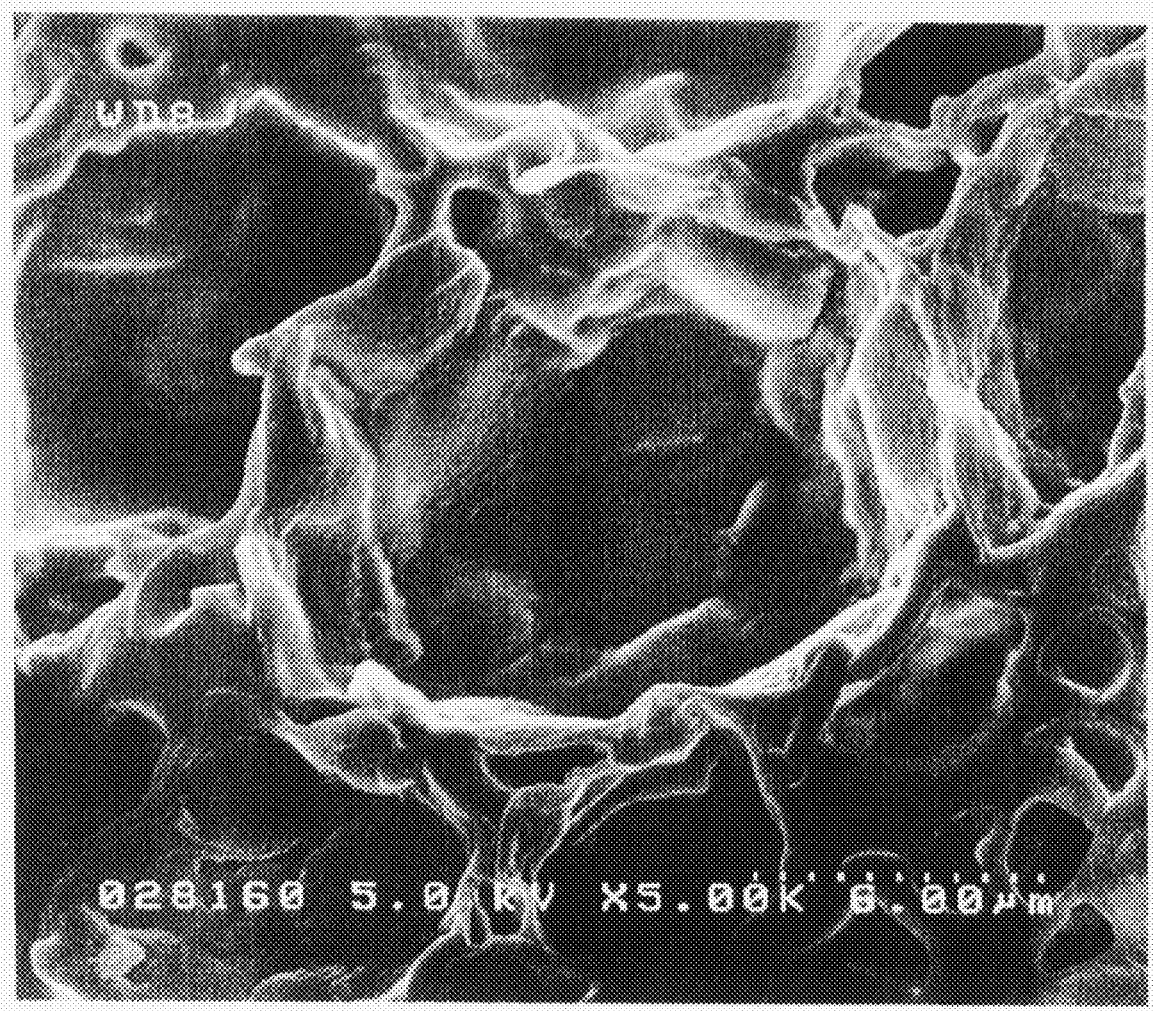
FIG. 8 is a view showing a SEM photograph of the liquid crystal-containing composition of the liquid crystal display device obtained in Comparative Example A1.

With respect to the obtained liquid crystal display device, the reflection spectra at bright display time and dark display time just after the production of the device, and the reflection spectra at bright display time and dark display time after the device is stored at 55° C. for one hour are measured. The results are shown in FIG. 7. A SEM photograph of the liquid crystal-containing composition of the liquid crystal display device is shown in FIG. 8.

Example B

Particle Production Type by Addition of a Monomer

Comparative Example B2

84 parts of a nematic liquid crystal E7 (manufactured by Merck Co., Ltd.), 10.8 parts of a chiral agent R811 (manufactured by Merck Co., Ltd.) and 2.7 parts of a chiral agent R1011 (manufactured by Merck Co., Ltd.) are mixed to obtain 100 parts of a cholesteric liquid crystal that selectively reflects light having a wavelength of 650 nm. This cholesteric liquid crystal, 10 parts of a polyvalent isocyanate (trade name: TAKENATE D-110N, manufactured by Takeda Pharmaceutical Company Limited.), 3 parts of octadecanol (manufactured by Aldrich Corporation) as a precursor of a vertical orientating component and 0.25 parts of a polyol (trade name: ADOCOAT AD-502, manufactured by Toyo Moton) are dissolved in 1000 parts of ethyl acetate to prepare an oil phase composition. Then, this composition is poured into 10,000 parts of an aqueous 1% polyvinyl alcohol solution and the mixture is stirred and dispersed by a mixer to produce an o/w emulsion having a diameter of about 7 µm.

Next, 100 parts of an aqueous 10% polyallylamine (manufactured by Nitto Boseki Co., Ltd.) solution is added to the obtained mixture, which is then heated at 70° C. for 2 hours to polymerize polyallylamine, water and isocyanate, thereby producing microcapsules having a polyurea wall. The isocyanate polymerized also with the polyol to produce polyurethane particles, which adhere to the inside wall of the microcapsule to provide concave and convex portions. After the microcapsules are collected by centrifugation, an aqueous polyvinyl alcohol solution is added to the microcapsules to prepare a microcapsule liquid crystal coating material.

Next, the above microcapsule liquid crystal coating material is applied to a commercially available ITO deposited PET resin film by an applicator in a dry thickness of 30 µm. An aqueous polyvinyl alcohol solution in which carbon black is dispersed is applied thereon in a dry thickness of 3 µm to form a light absorbing layer. Separately, a separate ITO deposited PET resin film is prepared, and a two-liquid urethane type adhesive is applied thereon in a dry thickness of 3 µm. Then, this film is adhered to the above substrate that is coated with the microcapsule liquid crystal coating material to produce a liquid crystal display device.

Figure 9:
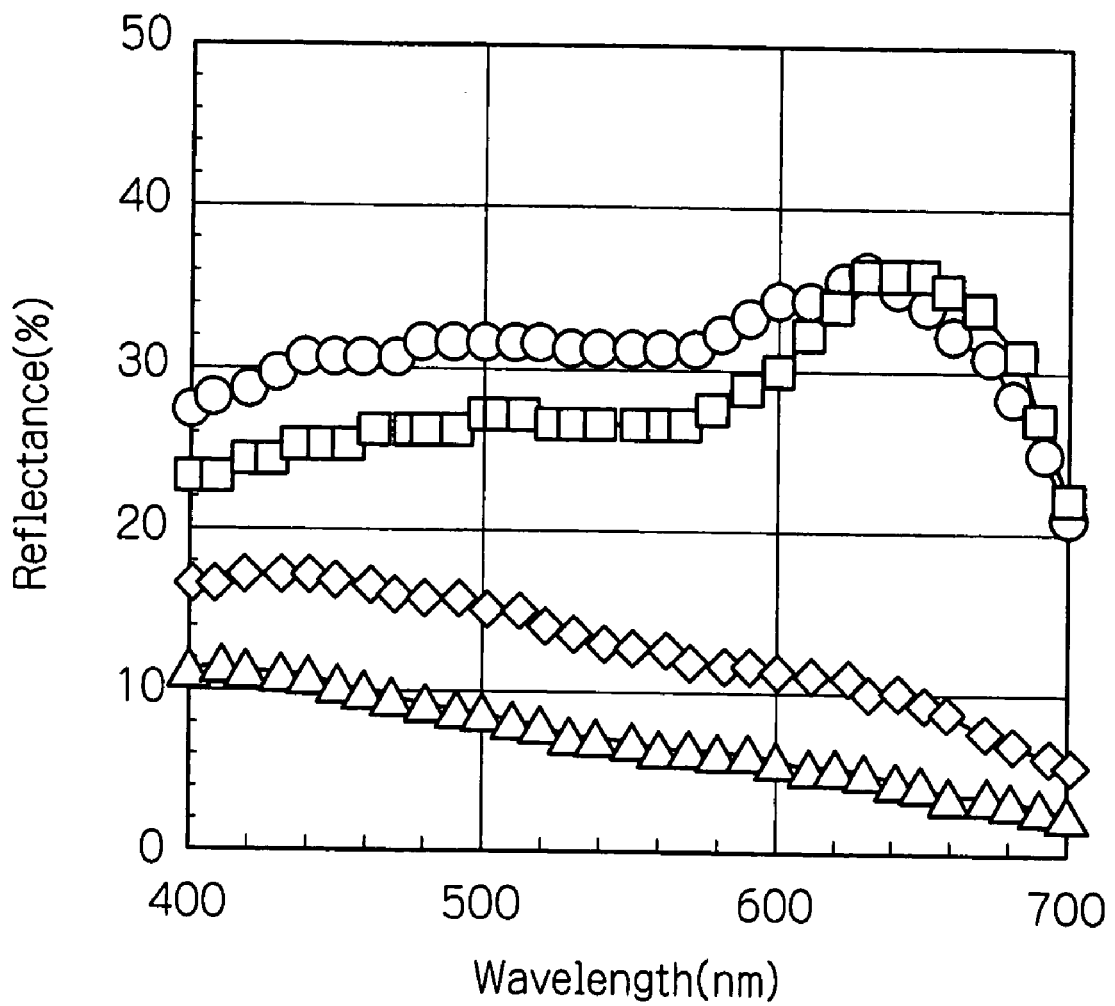
FIG. 9 is a view showing the reflection spectrum of the liquid crystal display device obtained in Comparative Example B2 at bright display time and dark display time.
Figure 10:
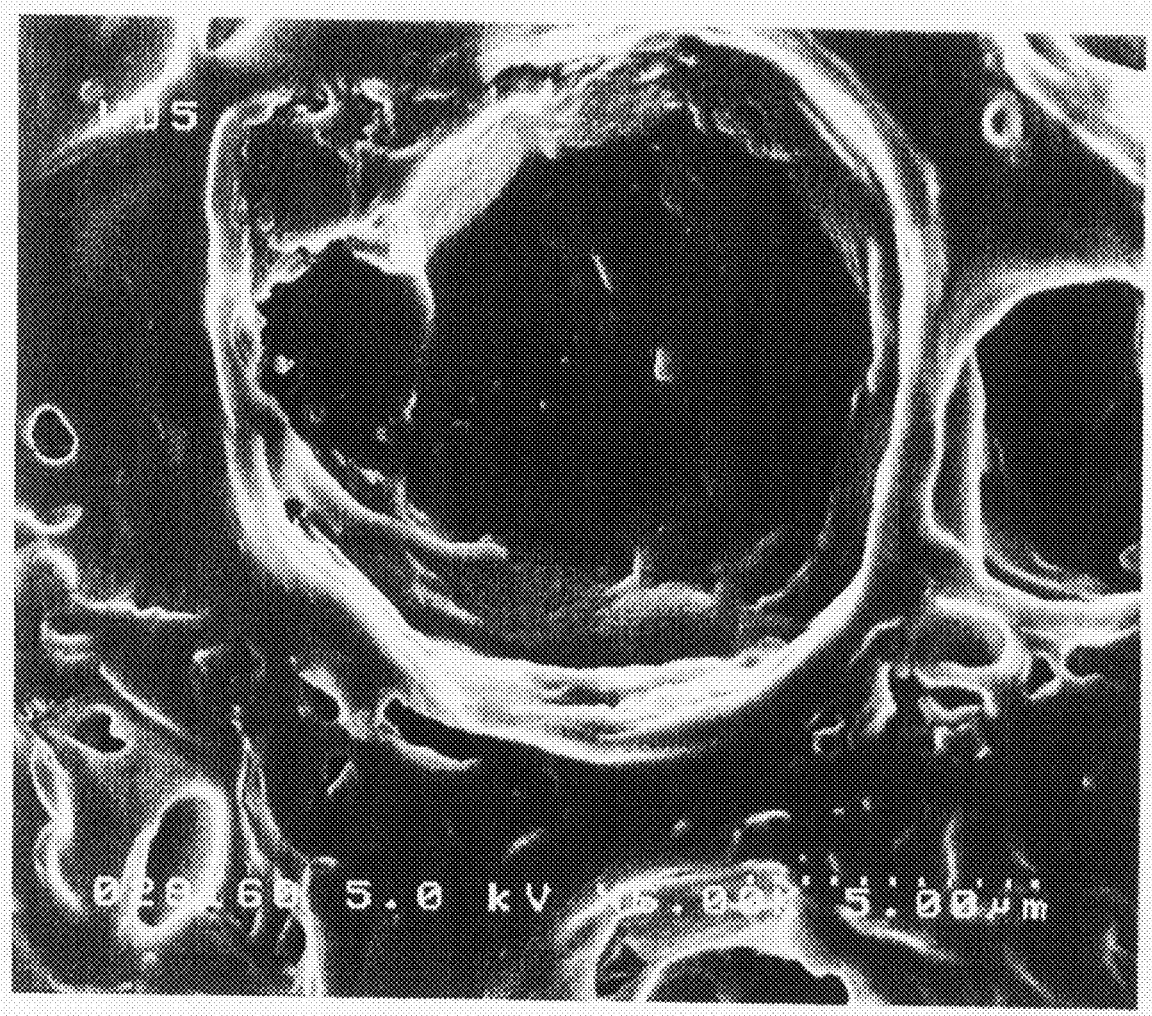
FIG. 10 is a view showing a SEM photograph of the liquid crystal-containing composition of a liquid crystal display device obtained in Comparative Example B2.

With respect to the obtained liquid crystal display device, the reflection spectra at bright display time and dark display time just after the production of the device, and the reflection spectra at bright display time and dark display time after the device is stored at 55° C. for one hour are measured. The results are shown in FIG. 9. A SEM photograph of the liquid crystal-containing composition of the liquid crystal display device is shown in FIG. 10. Also, the particle density of the polyurethane particles present at the interface between the cholesteric liquid crystal and the microcapsule is measured, and is found to be 0.2 particles/µm$^2$. The average particle diameter of the polyurethane particles is 200 nm.

Example B2

A liquid crystal display device is produced in the same manner as in Comparative Example B2 except that the amount of the polyol to be added is altered to 2.5 parts.

Figure 11:
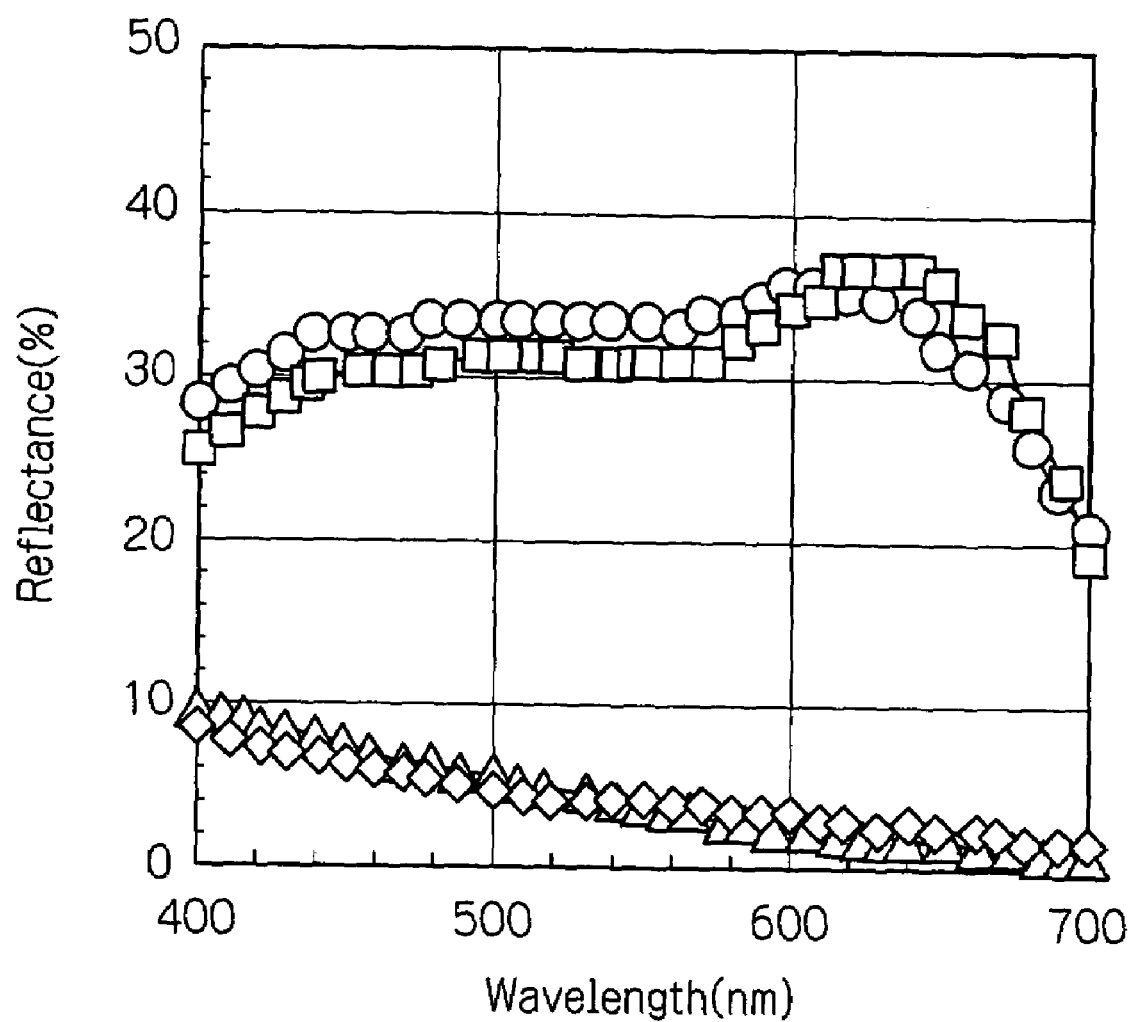
FIG. 11 is a view showing the reflection spectrum of the liquid crystal display device obtained in Example B2 at bright display time and dark display time.
Figure 12:
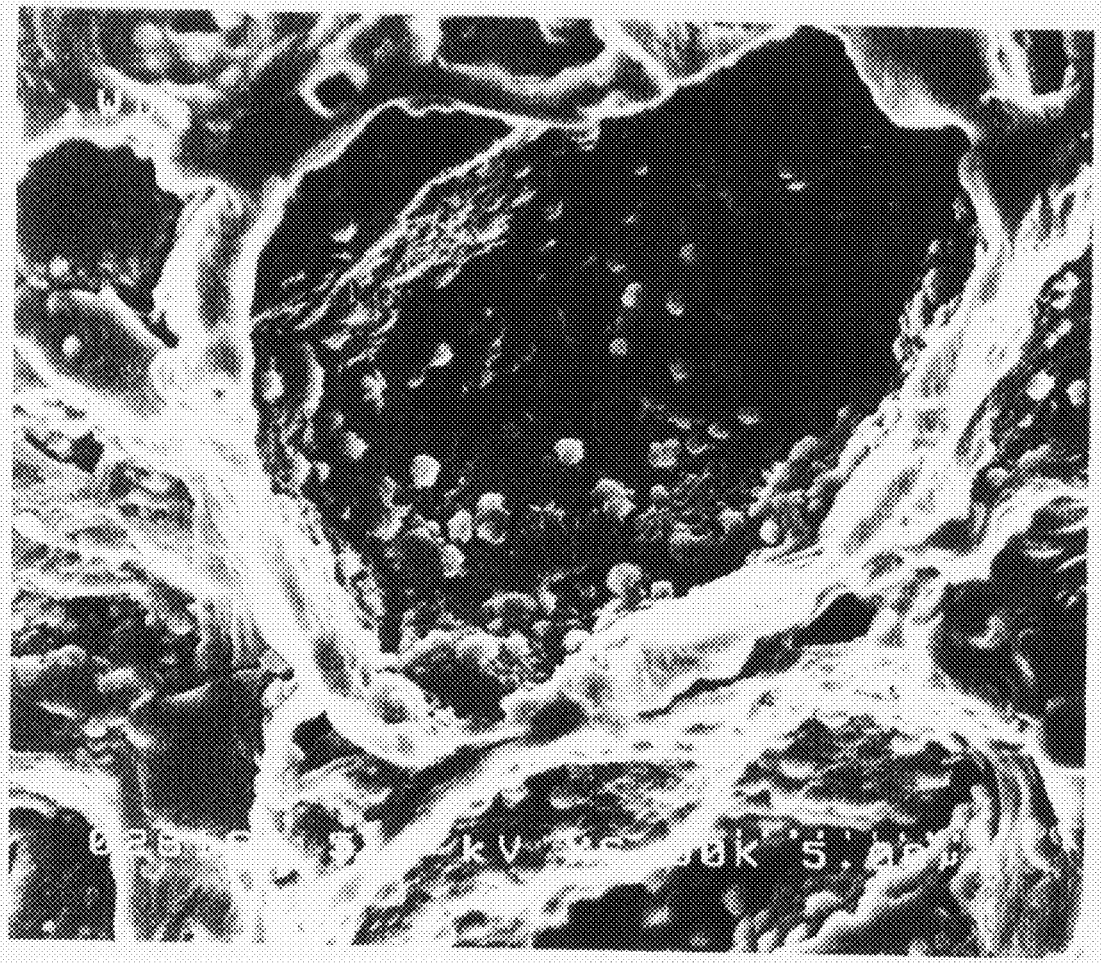
FIG. 12 is a view showing a SEM photograph of the liquid crystal-containing composition of the liquid crystal display device obtained in Example B2.

With respect to the obtained liquid crystal display device, the reflection spectra at bright display time and dark display time just after the production of the device, and the reflection spectra at bright display time and dark display time after the device is stored at 55° C. for one hour are measured. The results are shown in FIG. 11. A SEM photograph of the liquid crystal-containing composition of the liquid crystal display device is shown in FIG. 12. Also, the particle density of the polyurethane particles present at the interface between the cholesteric liquid crystal and the microcapsule is measured, and is found to be 3.0 particles/µm$^2$. The average particle diameter of the polyurethane particles is 250 nm.

Example B3

A liquid crystal display device is produced in the same manner as in Comparative Example B2 except that the amount of the polyol to be added is altered to 3.0 parts.

Figure 13:
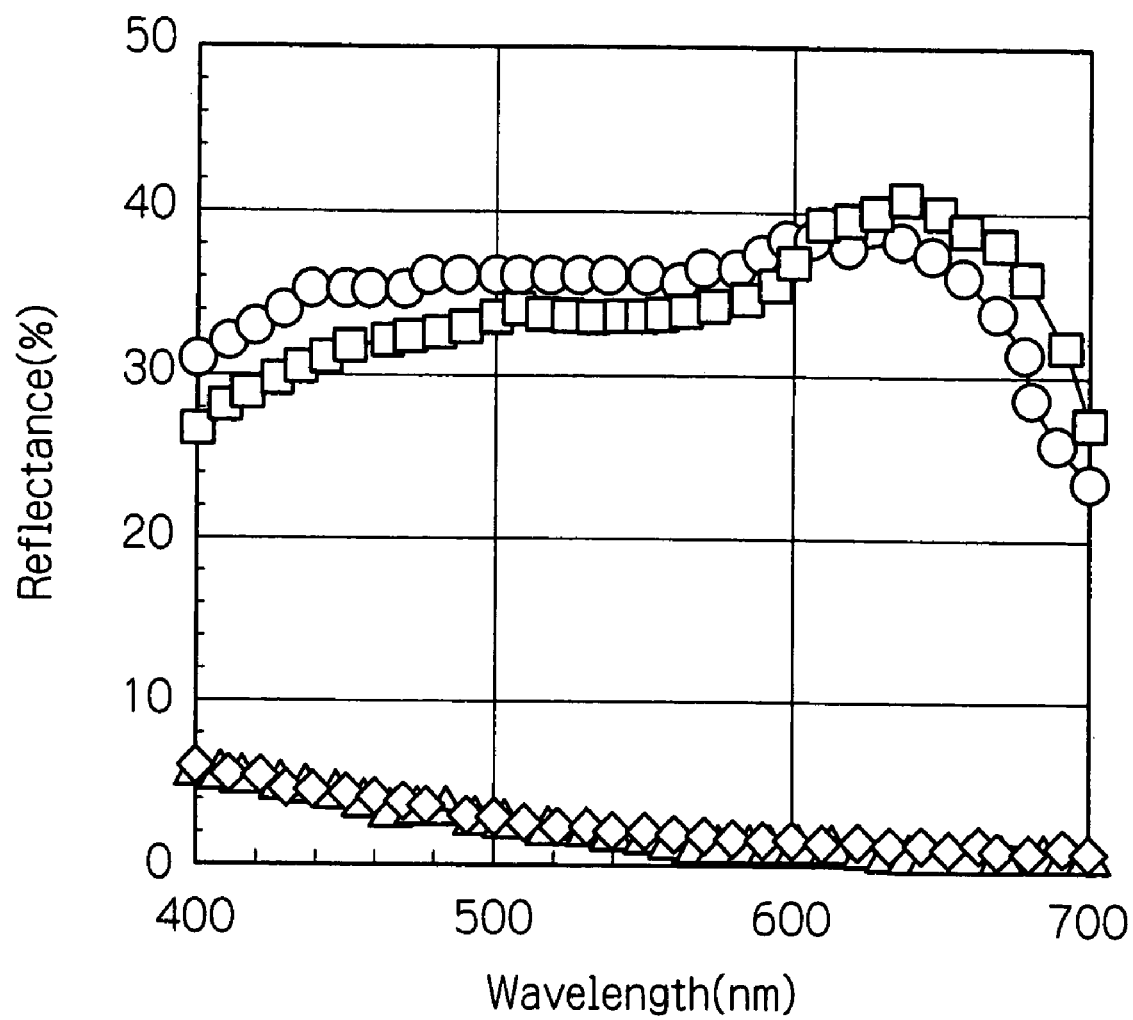
FIG. 13 is a view showing the reflection spectrum of the liquid crystal display device obtained in Example B3 at bright display time and dark display time.
Figure 14:
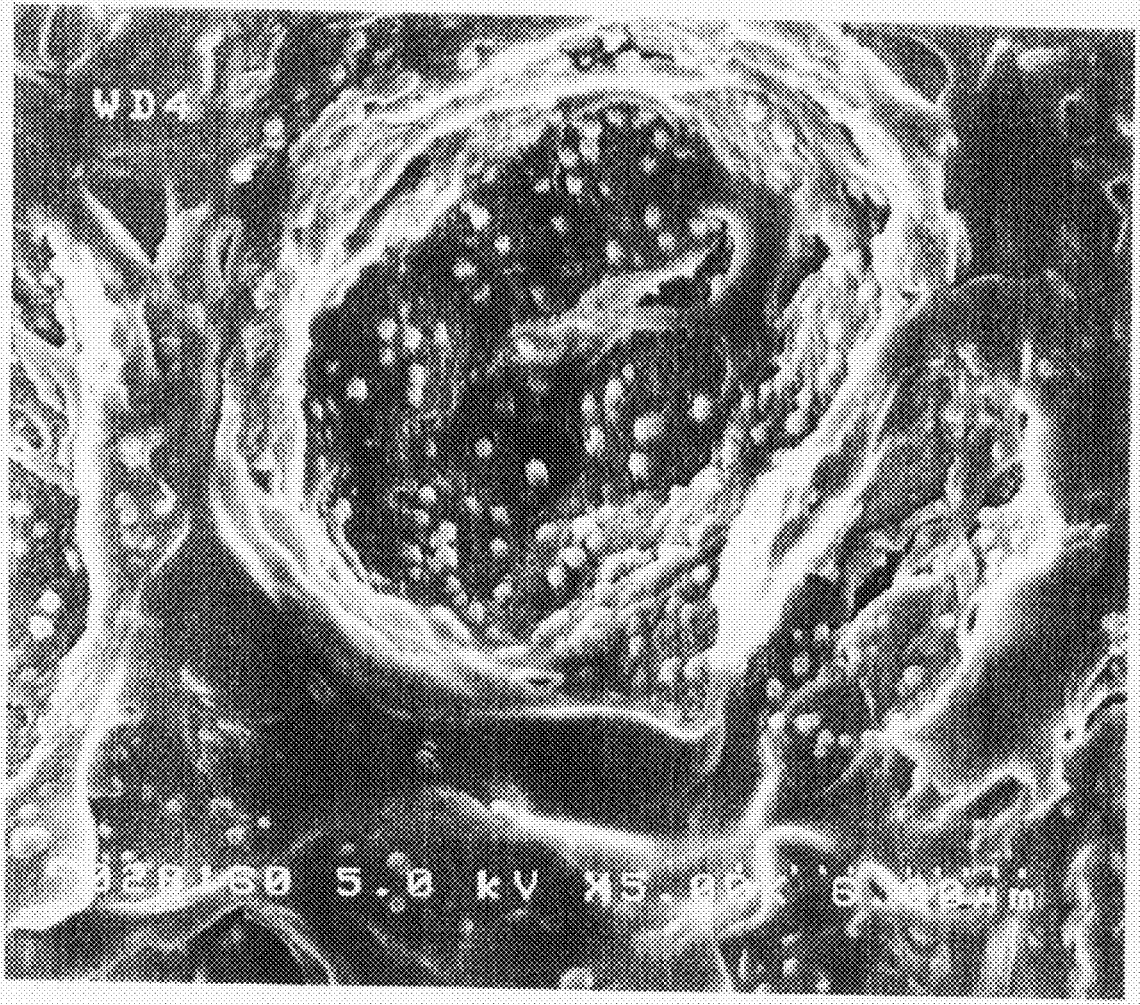
FIG. 14 is a view showing a SEM photograph of the liquid crystal-containing composition of the liquid crystal display device obtained in Example B3.

With respect to the obtained liquid crystal display device, the reflection spectra at bright display time and dark display time just after the production of the device, and the reflection spectra at bright display time and dark display time after the device is stored at 55° C. for one hour are measured. The results are shown in FIG. 13. A SEM photograph of the liquid crystal-containing composition of the liquid crystal display device is shown in FIG. 14. Also, the particle density of the polyurethane particles present at the interface between the cholesteric liquid crystal and the microcapsule is measured, and is found to be 0.9 particles/µm$^2$. The average particle diameter of the polyurethane particles is 300 nm.

Example B4

A liquid crystal display device is produced in the same manner as in Comparative Example B2 except that the amount of the polyol to be added is altered to 10 parts.

Figure 15:
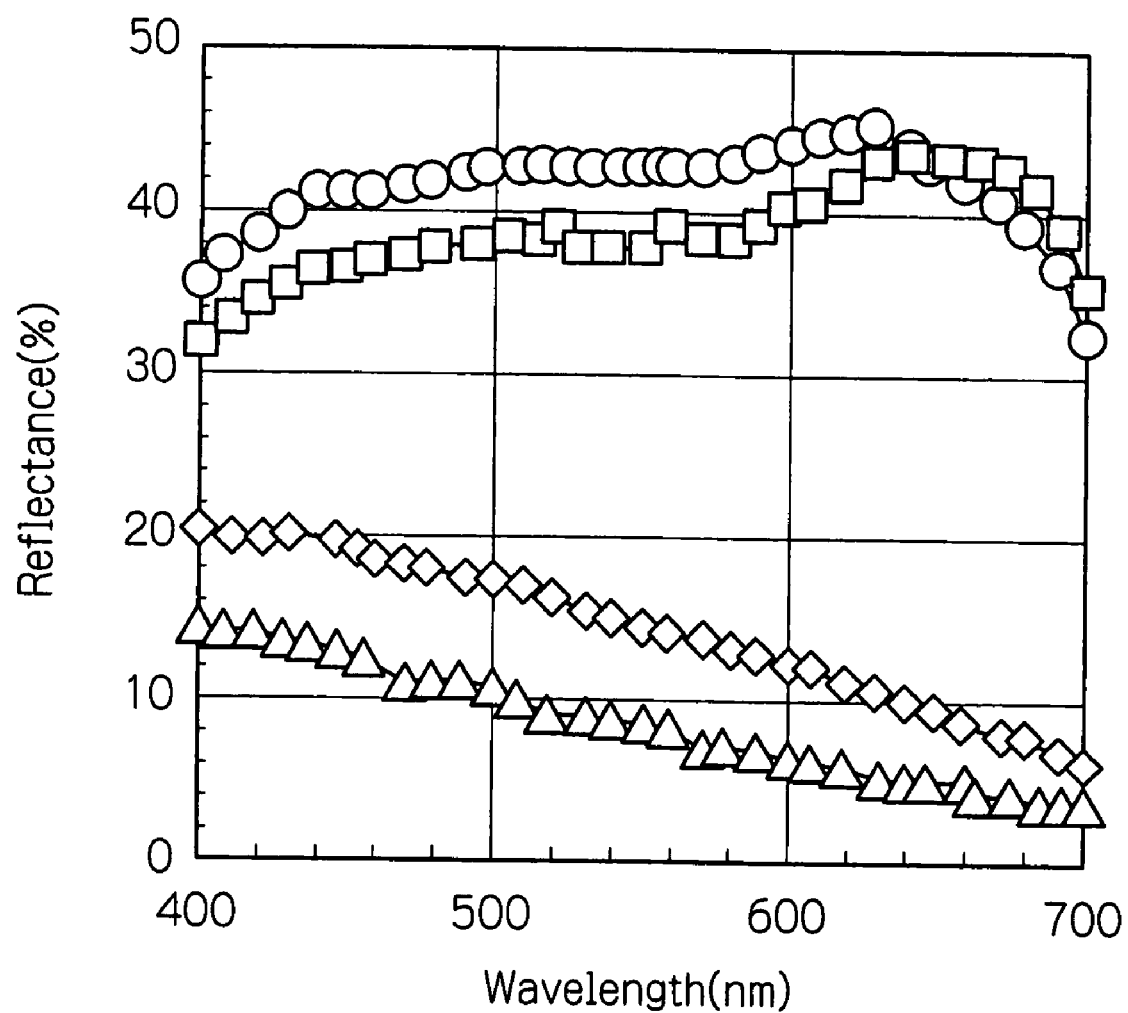
FIG. 15 is a view showing the reflection spectrum of the liquid crystal display device obtained in Example B4 at bright display time and dark display time.
Figure 16:
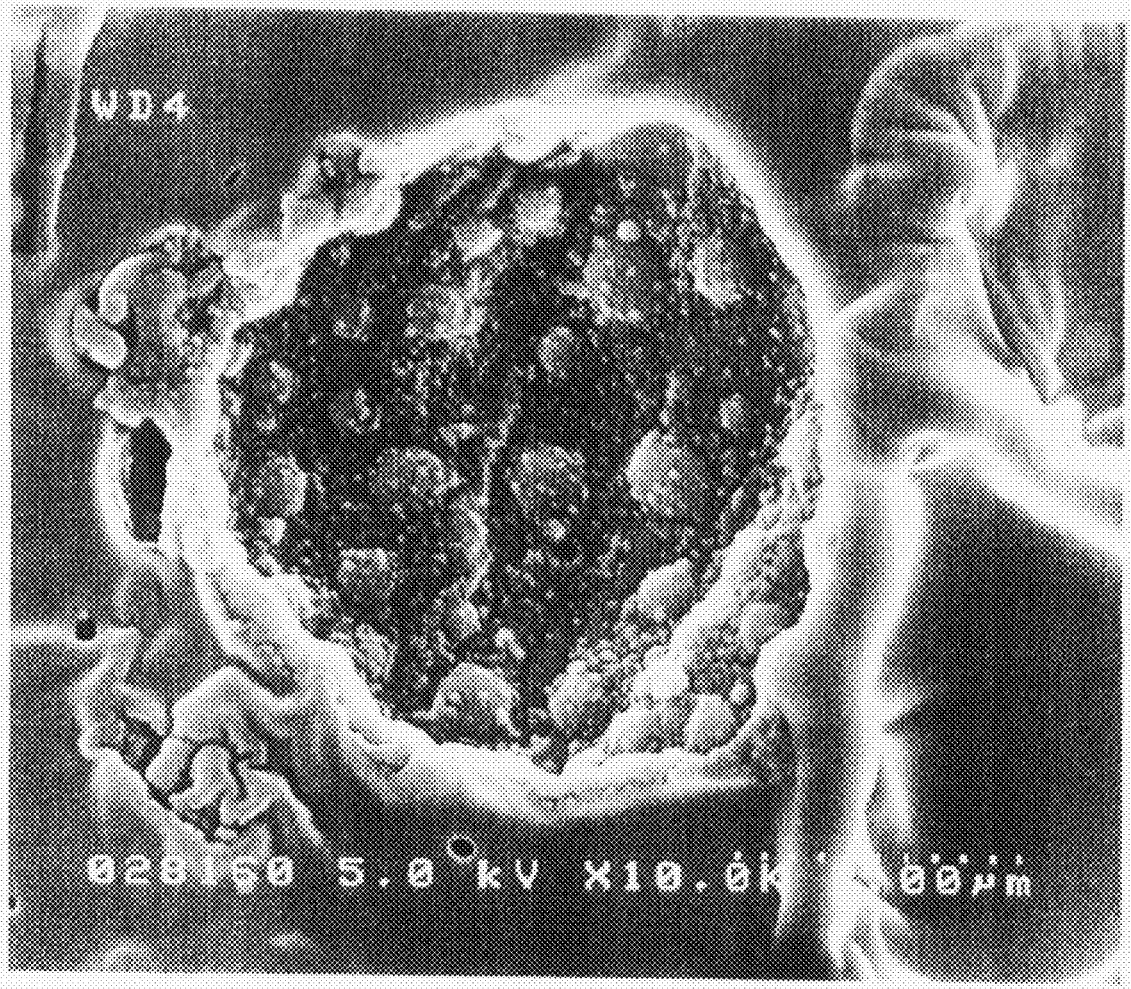
FIG. 16 is a view showing a SEM photograph of the liquid crystal-containing composition of the liquid crystal display device obtained in Example B4.

With respect to the obtained liquid crystal display device, the reflection spectra at bright display time and dark display time just after the production of the device, and the reflection spectra at bright display time and dark display time after the device is stored at 55° C. for one hour are measured. The results are shown in FIG. 15. A SEM photograph of the liquid crystal-containing composition of the liquid crystal display device is shown in FIG. 16. Also, the particle density of the polyurethane particles present at the interface between the cholesteric liquid crystal and the microcapsule is measured, and is found to be 0.3 particles/µm$^2$. The average particle diameter of the polyurethane particles is 1 µm.

Comparative Example B1

A liquid crystal display device is produced in the same manner as in Comparative Example B2 except that the polyol is not added.

Figure 17:
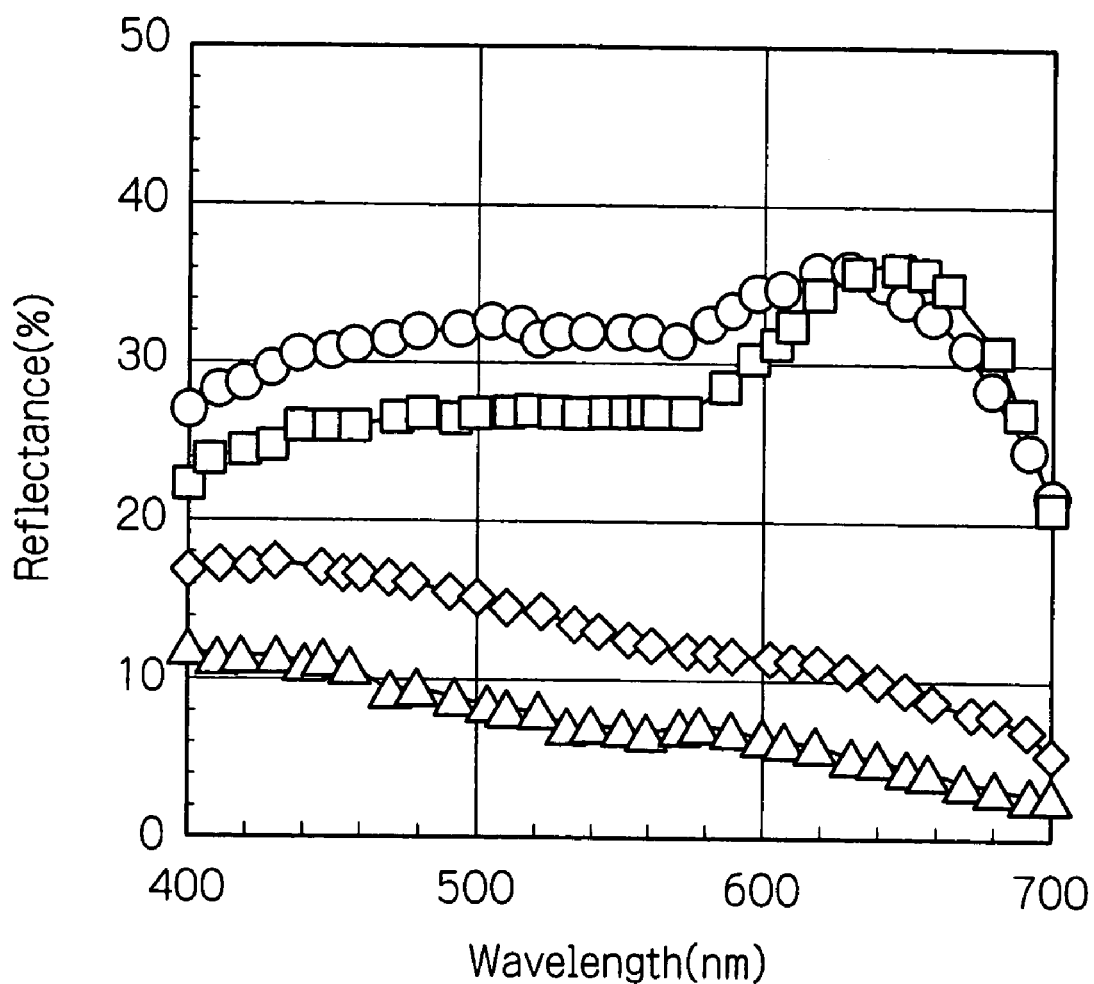
FIG. 17 is a view showing the reflection spectrum of the liquid crystal display device obtained in Comparative Example B4 at bright display time and dark display time.
Figure 18:
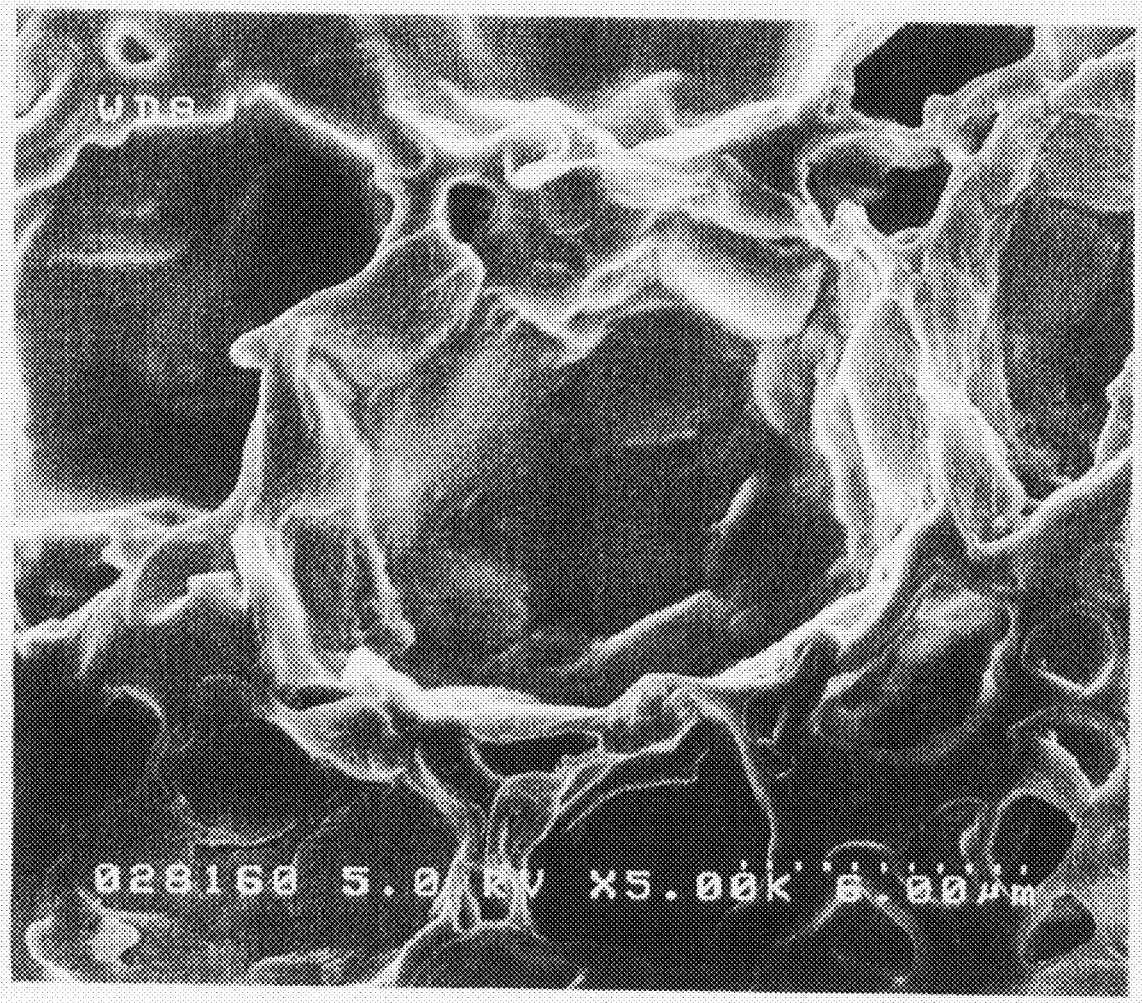
FIG. 18 is a view showing a SEM photograph of the liquid crystal-containing composition of the liquid crystal display device obtained in Comparative Example B4.

With respect to the obtained liquid crystal display device, bright display patch and dark display patch are written in the device, and the initial reflection spectra are measured. These display patches are stored at 55° C. for one hour, then cooled to room temperature and measured the reflection spectra again. The results are shown in FIG. 17. A SEM photograph of the liquid crystal-containing composition of the liquid crystal display device is shown in FIG. 18.

The results of the above Examples A and B are collectively shown in Tables 1 and 2. The evaluation criteria for the high-temperature memory stability are as follows. The luminous reflectance Yb before the test and the reflectance Ya after the test are measured with a spectrophotometer CM2022 (manufactured by Conica Minolta Co., Ltd.) to determine a variation coefficient a defined by the following equation.

$$\alpha = (Ya - Yb)/Yb$$

Regarding White Reflectance:
A: absolute value of the variation coefficient α for white reflectance is less than 6%;
B: absolute value of the variation coefficient α for white reflectance is 6% or more but less than 15%;
C: absolute value of the variation coefficient α for white reflectance is 15% or more.

Regarding Black Reflectance
A: absolute value of the variation coefficient α for black reflectance is less than 25%;
B: absolute value of the variation coefficient α for black reflectance is 25% or more but less than 60%;
C: absolute value of the variation coefficient a for black reflectance is 60% or more.

In consideration of these evaluations, overall evaluation of the high-temperature memory stability is conducted according to the following criteria.

A: both of the variation coefficients for white reflectance and black reflectance are in grade A.

B: the variation coefficients for white reflectance and black reflectance are respectively in grade A and grade B, grade B and grade A, or grade B and grade B.

C: at least one of the variation coefficients for white reflectance and black reflectance is in grade C.

C+: one of the variation coefficients for white reflectance and black reflectance is in grade B.

TABLE 1

| | Particle diameter of particles (nm) | Amount of particles to be added (% based on the liquid crystal) | Surface density of particles (number/$\mu m^2$) | High-temperature memory stability |
|---|---|---|---|---|
| Example A1 | 70 | 0.6 | 7.8 | B |
| Example A2 | 70 | 1.8 | 15.0 | B |
| Example A3 | 70 | 6.0 | 23.0 | B |
| Example A4 | 130 | 0.6 | 3.2 | B |
| Example A5 | 130 | 1.8 | 6.0 | A |
| Example A6 | 130 | 6.0 | 16.0 | A |
| Example A7 | 300 | 0.6 | 1.2 | B |
| Example A8 | 300 | 1.8 | 1.7 | A |
| Example A9 | 300 | 6.0 | 2.0 | A |
| Comparative Example A1 | — | 0 | 0 | C |

TABLE 2

| | Particle diameter of particles (nm) | Surface density particles of (number/$\mu m^2$) | High-temperature memory stability |
|---|---|---|---|
| Comparative Example B2 | 200 | 0.2 | C |
| Example B2 | 250 | 3.1 | A |
| Example B3 | 300 | 0.9 | A |
| Example B4 | 1000 | 0.3 | C+ |
| Comparative Example B1 | — | 0 | C |

From the above results, it is found that all Examples A1 to A9 exhibit improved high-temperature memory stability compared to Comparative Examples in which addition of particles is not conducted. Also, Examples B2 and B3 exhibit improved high-temperature memory stability compared to Comparative Examples in which precipitation of particles is not conducted. Example B4 exhibits low high-temperature memory stability at black display time but exhibits slightly improved high-temperature memory stability at white display time compared to Comparative Example B2 having lower particle density. Comparative Examples B1 and B2, in which the particle density is low, exhibit low high-temperature memory stability.

What is claimed is:

1. A liquid crystal-containing composition comprising
a cholesteric liquid crystal,
a polymer, wherein the polymer forms a microcapsule that encapsulates the cholesteric liquid crystal,
and particles,
wherein the particles are at an interface between the cholesteric liquid crystal and the polymer, the particles forming concave and convex portions located at the interface between the cholesteric liquid crystal and the microcapsule.

2. The liquid crystal-containing composition of claim 1, wherein the polymer is a resin material that forms a separate phase from the cholesteric liquid crystal in which the cholesteric liquid crystal is dispersed.

3. The liquid crystal-containing composition of claim 1, wherein an average particle diameter of the particles is in a range from about 1/10 to 5 times a helical pitch of the cholesteric liquid crystal.

4. The liquid crystal-containing composition of claim 1, wherein an average particle diameter of the particles is in a range from about 1/10 to 2 times a helical pitch of the cholesteric liquid crystal.

5. The liquid crystal-containing composition of claim 1, wherein an average particle diameter of the particles is in a range from about 40 nm to 2 μm.

6. The liquid crystal-containing composition of claim 1, wherein a density of the particles at the interface is from about 0.3 to 20 particles/$\mu m^2$.

7. The liquid crystal-containing composition of claim 1, wherein a density of the particles at the interface is from about 0.5 to 5 particles/$\mu m^2$.

8. A liquid crystal display device comprising a pair of electrodes and the liquid crystal-containing composition of claim 1 sandwiched between the pair of electrodes.

9. A method of producing the liquid crystal-containing composition of claim 1, the method comprising adding the particles to a mixture of the polymer or precursor thereof and the cholesteric liquid crystal.

10. The method of producing a liquid crystal-containing composition of claim 9, wherein an average particle diameter of the particles is in a range from about 1/10 to 5 times a helical pitch of the cholesteric liquid crystal.

11. A method of producing the liquid crystal-containing composition of claim 1, the method comprising adding monomer as a raw material of the particles to a mixture of the polymer or precursor thereof and the cholesteric liquid crystal, and then polymerizing the monomer to precipitate the particles.

12. The method of producing a liquid crystal-containing composition of claim 11, wherein an average particle diameter of the particles is in a range from about 1/10 to 5 times a helical pitch of the cholesteric liquid crystal.

* * * * *